United States Patent
Wright et al.

(10) Patent No.: US 7,409,011 B2
(45) Date of Patent: Aug. 5, 2008

(54) SYSTEMS AND METHODS FOR THE DYNAMIC RANGE COMPRESSION OF MULTI-BEARER SINGLE-CARRIER AND MULTI-CARRIER WAVEFORMS

(75) Inventors: Andrew S. Wright, Vancouver (CA); Richard E. Ryan, Vancouver (CA); Bartholomeus T. W. Klijsen, Surrey (CA); Denis John Peregrym, North Vancouver (CA); Brenda Davison, West Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 113 days.

(21) Appl. No.: 11/411,336

(22) Filed: Apr. 26, 2006

(65) Prior Publication Data

US 2006/0198465 A1  Sep. 7, 2006

Related U.S. Application Data

(63) Continuation of application No. 09/910,422, filed on Jul. 20, 2001, now Pat. No. 7,061,990.

(60) Provisional application No. 60/220,018, filed on Jul. 21, 2000.

(51) Int. Cl.
   *H04L 25/49* (2006.01)
(52) U.S. Cl. .................................. 375/296; 455/114.3
(58) Field of Classification Search ......... 375/259–260, 375/285, 295–297; 455/67.13, 102–103, 455/114.2, 114.3, 115.1, 115.2, 115.3; 370/206–208
   See application file for complete search history.

(56) References Cited

U.S. PATENT DOCUMENTS 5,201,071 A   4/1993  Webb 5,302,914 A   4/1994  Arntz et al.

(Continued)

FOREIGN PATENT DOCUMENTS

EP   594 358 A1   10/1993

(Continued)

OTHER PUBLICATIONS

Office Action mailed Oct. 16, 2007; U.S. Appl. No. 11/411,344, filed Apr. 26, 2006.

*Primary Examiner*—Khanh C Tran
(74) *Attorney, Agent, or Firm*—Knobbe Martens Olson & Bear LLP

(57) ABSTRACT

The present invention is related to methods and apparatus that can advantageously reduce a peak to average signal level exhibited by single or by multicarrier multibearer waveforms. Embodiments of the invention further advantageously can manipulate the statistics of the waveform without expanding the spectral bandwidth of the allocated channels. Embodiments of the invention can be applied to either multiple carrier or single carrier systems to constrain an output signal within predetermined peak to average bounds. Advantageously, the techniques can be used to enhance the utilization of existing multicarrier RF transmitters, including those found in third generation cellular base stations. However, the peak to average power level managing techniques disclosed herein can apply to any band-limited communication system and any type of modulation. The techniques can apply to multiple signals and can apply to a wide variety of modulation schemes or combinations thereof.

9 Claims, 20 Drawing Sheets

U.S. PATENT DOCUMENTS

| | | | |
|---|---|---|---|
| 5,381,449 A | 1/1995 | Jasper et al. | |
| 5,621,762 A | 4/1997 | Miller et al. | |
| 5,696,794 A | 12/1997 | O'Dea | |
| 5,710,990 A | 1/1998 | Long et al. | |
| 5,793,797 A | 8/1998 | Giallorenzi et al. | |
| 5,805,640 A | 9/1998 | O'Dea et al. | |
| 5,815,532 A | 9/1998 | Bhattacharya et al. | |
| 5,838,732 A | 11/1998 | Carney | |
| 5,870,047 A | 2/1999 | Piesinger | |
| 5,894,498 A | 4/1999 | Kotzin et al. | |
| 5,930,299 A | 7/1999 | Vannatta et al. | |
| 5,960,028 A | 9/1999 | Okamoto et al. | |
| 5,970,053 A | 10/1999 | Schick et al. | |
| 5,991,262 A | 11/1999 | Laird et al. | |
| 6,009,090 A | 12/1999 | Oishi et al. | |
| 6,097,714 A | 8/2000 | Nagatani et al. | |
| 6,104,761 A | 8/2000 | McCallister et al. | |
| 6,125,103 A | 9/2000 | Bauml et al. | |
| 6,128,350 A | 10/2000 | Shastri et al. | |
| 6,130,916 A | 10/2000 | Thomson | |
| 6,141,390 A | 10/2000 | Cova | |
| 6,175,551 B1 | 1/2001 | Awater et al. | |
| 6,236,864 B1 | 5/2001 | McGowan et al. | |
| 6,304,140 B1 | 10/2001 | Thron et al. | |
| 6,424,678 B1 | 7/2002 | Doberstein et al. | |
| 6,529,925 B1 | 3/2003 | Schenk | |
| 6,563,856 B1 | 5/2003 | O'Shea et al. | |
| 6,741,663 B1 | 5/2004 | Tapio et al. | |
| 6,765,899 B1 | 7/2004 | Lundh et al. | |
| 6,907,066 B1 * | 6/2005 | Nayler | 375/239 |
| 7,061,990 B2 | 6/2006 | Wright et al. | |
| 7,061,991 B2 | 6/2006 | Wright et al. | |
| 2001/0000456 A1 | 4/2001 | McGowan | |

FOREIGN PATENT DOCUMENTS

| | | |
|---|---|---|
| EP | 594 358 A2 | 10/1993 |
| EP | 594 358 A3 | 10/1993 |
| EP | 940 925 A1 | 3/1998 |
| EP | 942 566 A3 | 3/1999 |
| EP | 991 201 A2 | 9/1999 |
| EP | 0993 136 A1 | 4/2000 |
| GB | 2 340 003 A | 2/2000 |
| WO | WO 98/58457 | 12/1998 |

* cited by examiner

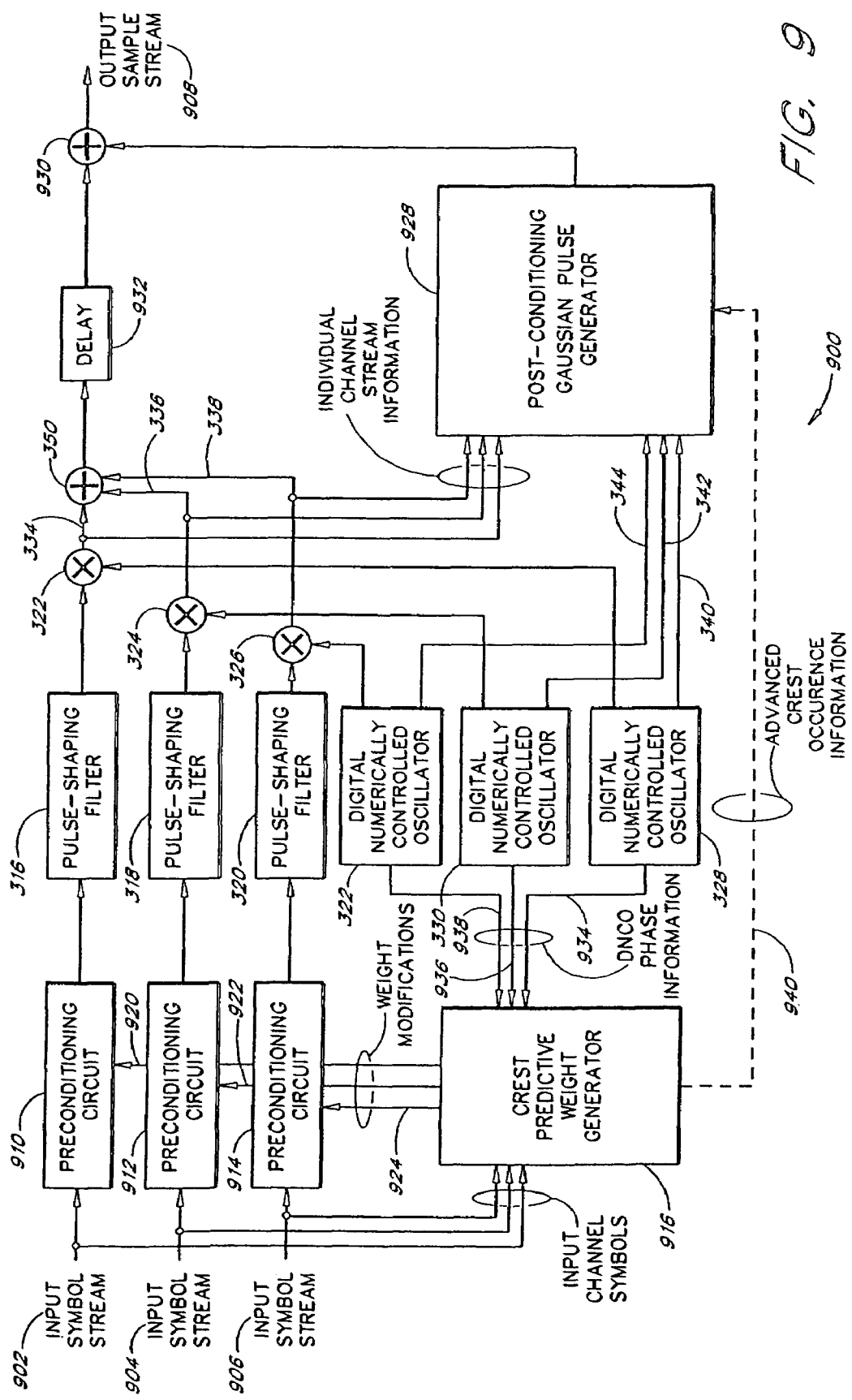

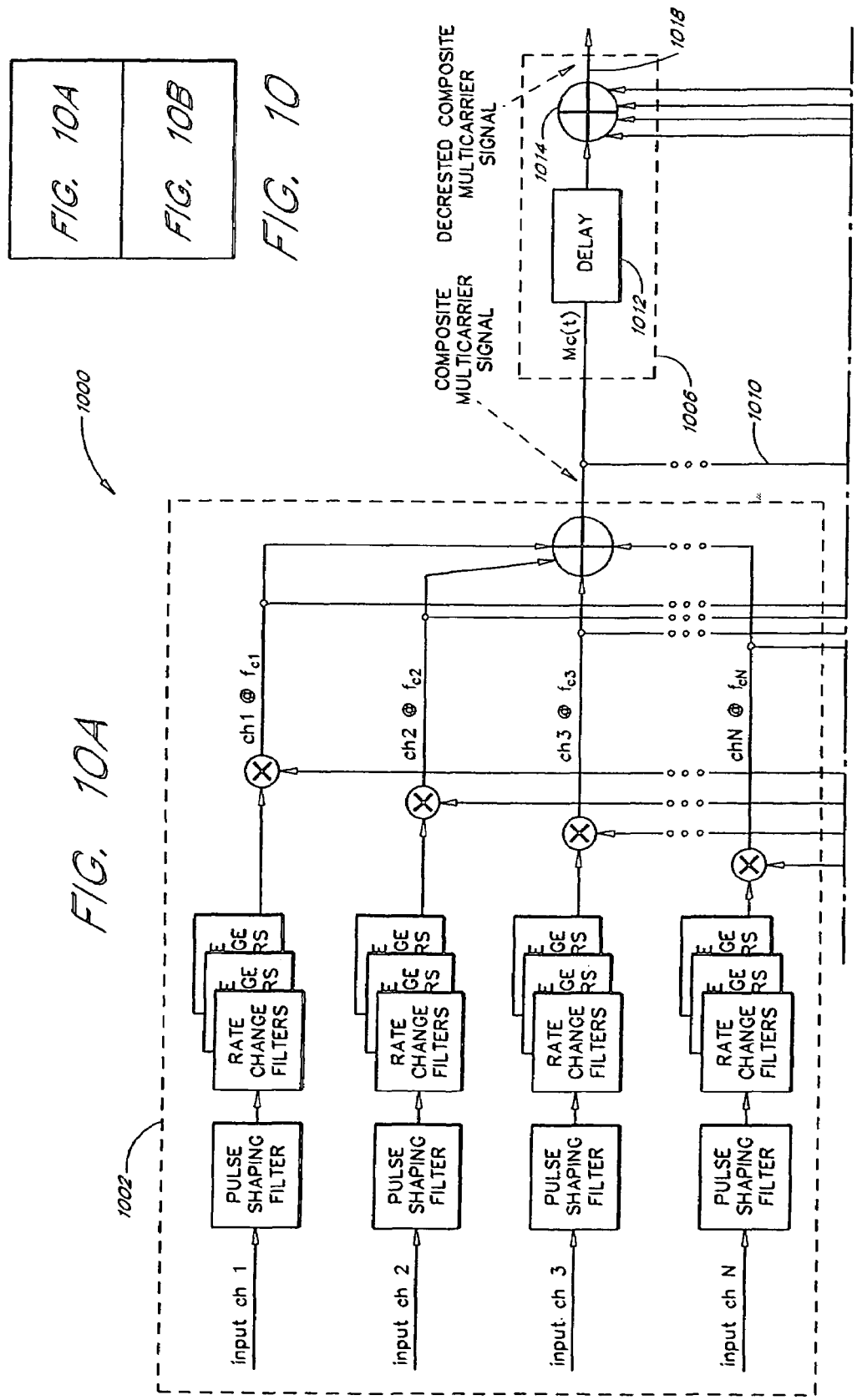

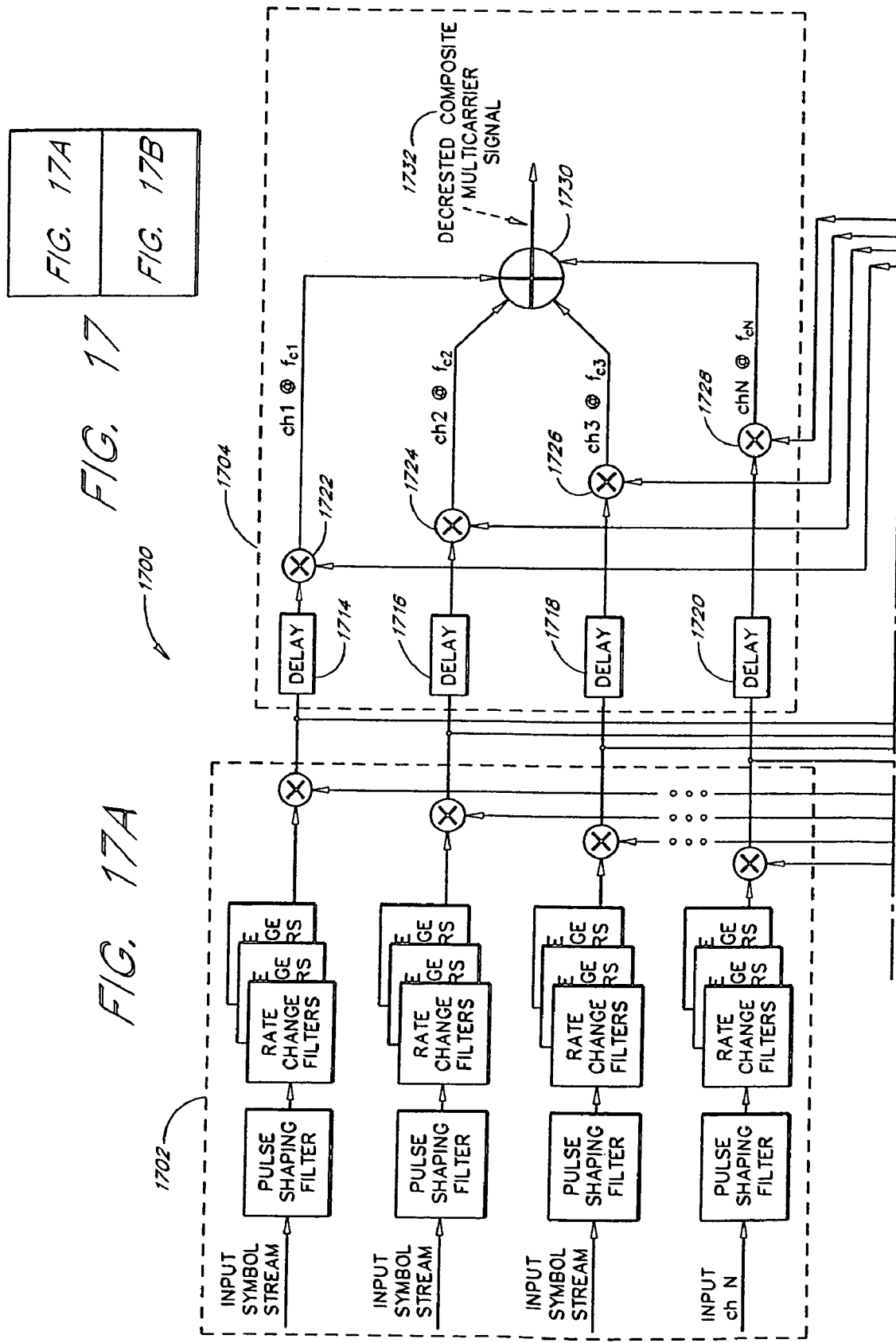

US 7,409,011 B2

SYSTEMS AND METHODS FOR THE DYNAMIC RANGE COMPRESSION OF MULTI-BEARER SINGLE-CARRIER AND MULTI-CARRIER WAVEFORMS

RELATED APPLICATIONS

This application is a continuation application of U.S. application Ser. No. 09/910,422, filed Jul. 20, 2001, now U.S. Pat. No. 7,061,990, issued on Jun. 13, 2006, which claims the benefit under 35 U.S.C. § 119(e) of U.S. Provisional Application No. 60/220,018, filed Jul. 21, 2000, the disclosures of which are hereby incorporated by reference in their entireties herein.

A co-pending and co-owned patent application with application Ser. No. 09/910,477, filed on Jul. 20, 2001, commonly owned and filed on the same day as the present application, is hereby incorporated herein in its entirety by reference thereto.

BACKGROUND OF THE INVENTION

1. Field of the Invention

The present invention generally relates to electronics. In particular, the present invention relates to communications systems.

2. Description of the Related Art

The rapid commoditization of the cellular, personal communication service (PCS) and wireless industries has resulted in the emergence of new digital radio standards, which support the emergence of high user bandwidth requirements. For example, third generation (3G) digital wide-band code division multiple access (W-CDMA) and Enhanced Data GSM (Group System for Mobile Communications) Environment (EDGE) air interface standards exploit signal processing techniques that can generate radio and baseband waveforms with a relatively high peak power to average power ratio.

The signals amplified by a wireless base station include multiple signals, which are combined to a multi-bearer waveform. The number of voice and data connections represented within the multi-bearer waveform can vary randomly and vary over time. Occasionally, the information sources that are combined to form the multi-bearer waveform can co-align and generate a relatively large instantaneous signal peak or crest. In one example, the relatively large instantaneous signal peak is about 10 times higher in power than a nominal or average output level.

In practice, the alignment that generates a relatively large instantaneous signal peak occurs with a relatively low probability. Despite the relatively low probability, however, the dynamic range of the entire signal processing chain of a base station should be sufficient to handle the large instantaneous signal peak in order to transmit the signal without error.

One conventional approach is to design the base station to accommodate the relatively rare, but large, signal peak. As a result, the base station is significantly overdesigned, which results in a significant increase to the cost of the base station. In particular, the cost and the size of the radio frequency (RF) amplifier of the base station are deleteriously affected. For example, such an approach disadvantageously lowers the efficiency of the RF amplifier, as a higher powered RF amplifier will waste significantly larger amounts of power for biases and the like. Further, the extra power dissipation is correspondingly dissipated with larger and more costly heat management techniques.

In addition, the relatively large dynamic range imposed upon the base station by the relatively large signal peak typically requires that the upconversion circuitry, the digital to analog converters, the digital signal processing circuits, and the like also accommodate the relatively large dynamic range.

In another conventional approach, the signal waveform is hard limited to reduce the dynamic range of the relatively rare signal peaks. This allows a relatively lower power RF transmitter to be used to transmit the signal, which allows the RF transmitter to operate with relatively larger efficiency. However, conventional hard limiting techniques are impractical because hard limiting generates distortion energy, which causes interference in adjacent channels.

SUMMARY OF THE INVENTION

Embodiments of the present invention include apparatus and methods that overcome the disadvantages of the prior art by manipulating a multibearer waveform, which can include single carrier or multiple carrier waveforms that reduce the peak to average ratio of the multibearer waveform. Advantageously, embodiments of the present invention allow radio frequency (RF) base stations to be more efficient, compact, and lower in cost than conventional base stations.

Embodiments of the invention permit significant reduction to the cost to provision digital and analog signal processing chains in communication systems. Embodiments of the invention may be applied to a variety of communications systems including both wire and wireless communications systems such as cellular, personal communications service (PCS), local multipoint distribution systems (LMDS), and satellite systems.

One embodiment of the invention includes a predictive weight generator that reduces an amount of waveshaping processing applied to a plurality of input symbol streams by a waveshaping circuit. The predictive weight generator includes pulse-shaping filter emulation circuits that receive the plurality of input symbol streams. A pulse-shaping filter emulation circuit can be constructed from a pulse-shaping circuit. The predictive weight generator further includes mixers coupled to the pulse-shaping filter emulation circuits and coupled to digital numerically controlled oscillators that upconvert actual outputs of actual pulse-shaping filters for the input symbol streams. The outputs of the mixers are summed by a summing circuit to simulate a composite signal and to thereby predict an amplitude of an actual composite signal. A comparator compares the predicted amplitude to a threshold level and provides weight value modifications to the waveshaping circuit in response to the comparison in real time.

One embodiment of the invention includes a post-conditioning circuit that generates a de-cresting pulse that can decrease an amplitude of a signal peak of a composite multi-carrier signal in real time. The composite multicarrier signal includes a plurality of input symbol streams that are pulse-shaped and frequency upconverted to a plurality of upconverted streams. The post-conditioning circuit includes a comparator, a weight generator, an impulse generator, a multiplier circuit, and a bandpass filter.

The comparator compares the composite multicarrier signal to a predetermined threshold such that the comparator activates an output when the composite multicarrier signal exceeds the predetermined threshold. The weight generator receives the plurality of upconverted streams and phase information from a plurality of oscillators as inputs. The weight generator also receives carrier waveforms for the plurality of upconverted streams so that the weight generator can determine an upconverted stream's contribution to the composite multicarrier signal's signal peak. The weight generator calculates a weight value for the upconverted stream approximately proportionately to the upconverted stream's contribution to the composite multicarrier signal's signal peak.

The impulse generator provides an impulse as an output in response to the output of the comparator. The impulse generator also controls a duration of the generated impulse in response to the output of the comparator. The multiplier circuit multiplies the weight value from the weight generator with the impulse from the impulse generator to generate a scaled impulse. The bandpass filter filters the scaled impulse to a frequency band that corresponds to the upconverted stream's allocated frequency band to generate the de-cresting pulse.

In one embodiment, multiple pulses are injected to de-crest the composite multicarrier signal. The multiple pulses can advantageously prevent the injection of signal energy to unutilized adjacent channel allocations.

One embodiment of the invention includes a pulse-shaping circuit that reduces a probability of an alignment in amplitude and phase of similar symbols in a plurality of input symbol streams. The plurality of input symbol streams are eventually upconverted and combined to a composite data stream and include at least a first input symbol stream and a second input symbol stream. Advantageously, a reduction in the probability of the alignment reduces a probability of a large signal crest in the composite data stream.

The pulse-shaping circuit includes a plurality of pulse-shaping filters, which pulse-shape the plurality of input symbol streams to a corresponding plurality of baseband streams. The pulse shaping circuit further includes a plurality of multipliers, which upconvert the plurality of baseband streams to a plurality of upconverted streams, and a summing circuit that combines the upconverted streams to the composite signal. The pulse shaping circuit also includes a delay circuit in at least a first data path. The first data path is a path from an input symbol stream to the composite data stream. The delay circuit delays data in the first data path by a fraction of a symbol period relative to data in a second data path to stagger symbols in the symbol streams.

One embodiment of the invention includes a composite waveform de-cresting circuit that digitally generates at least one de-cresting phase shift in real time that allows a composite multicarrier signal to be generated with a decrease in an amplitude of a signal peak. Advantageously, the circuit decreases the amplitude of the signal peak of the composite multicarrier signal without altering an amplitude of the plurality of input symbol streams. The circuit includes a computation circuit, a comparator, at least one impulse generator, and at least one phase shifter.

The computation circuit receives the plurality of upconverted streams and a phase information from a plurality of oscillators that provide carrier waveforms for the plurality of upconverted streams. The computation circuit predicts a level in the composite multicarrier signal. The comparator compares the predicted level of the composite multicarrier signal from the computation circuit to a predetermined threshold and the comparator activates an output when the composite multicarrier signal exceeds the predetermined threshold.

The weight generator receives the plurality of upconverted streams and a phase information from the plurality of oscillators that provide carrier waveforms for the plurality of upconverted streams. The weight generator calculates a weight value for an upconverted stream in the plurality of upconverted streams, where the weight value is approximately proportional to the upconverted stream's contribution to the predicted level of the composite multicarrier signal's signal peak.

The impulse generator provides an impulse as an output in response to the output of the comparator. The impulse generator also controls a duration of the generated impulse in response to the output of the comparator. The multiplier circuit multiplies the weight value from the weight generator with the impulse from the impulse generator to generate a scaled impulse. The bandpass filter that filters the scaled impulse to a frequency band that corresponds to the upconverted stream's allocated frequency band to generate a de-cresting phase-shift control signal. The phase shifter modulates a relative phase of the upconverted stream in response to the de-cresting phase-shift control signal.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

FIG. 9 illustrates a waveshaping circuit according to an embodiment of the present invention.

DETAILED DESCRIPTION OF PREFERRED EMBODIMENTS

Although this invention will be described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

Figure 1:
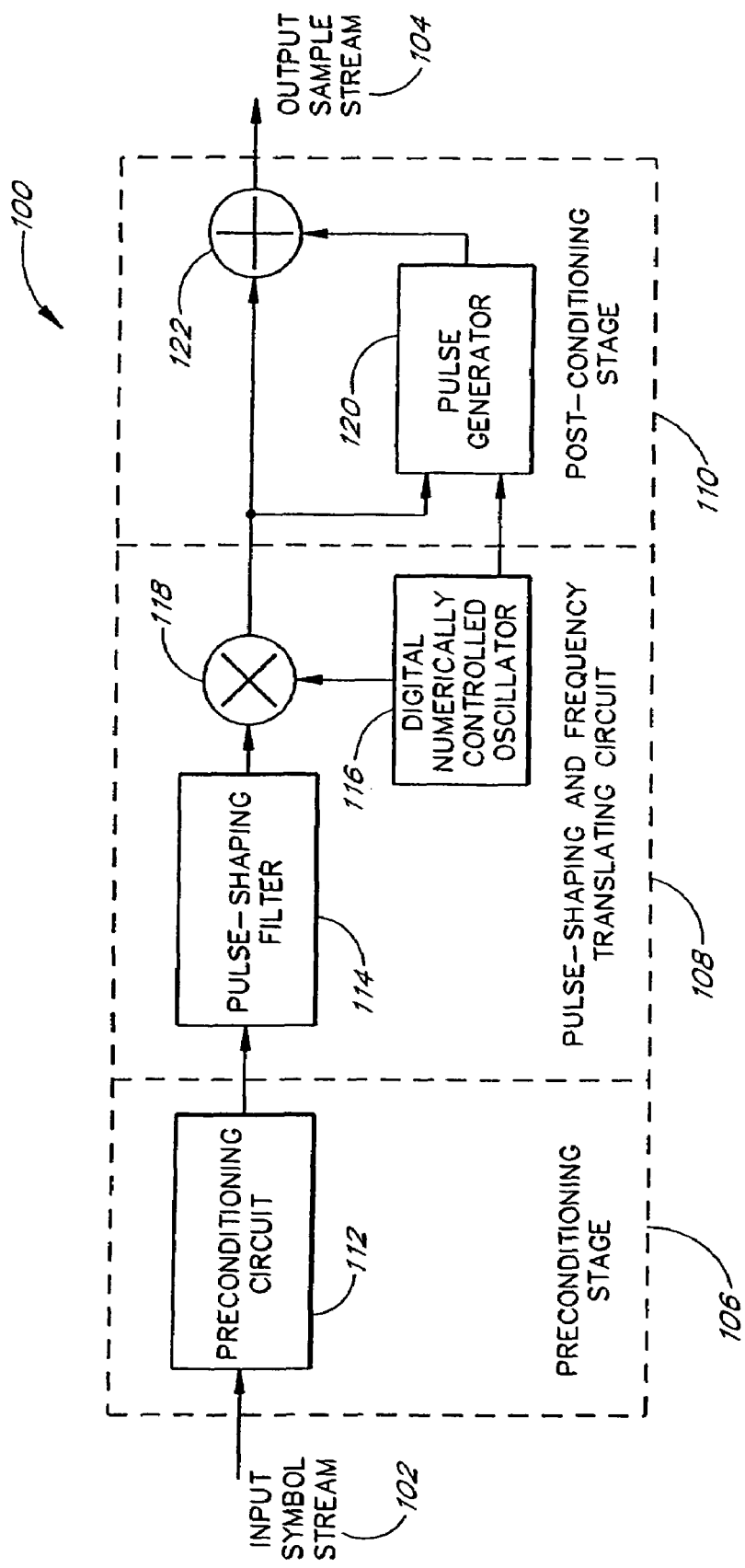
FIG. 1 illustrates a waveshaping circuit according to one embodiment of the present invention.

FIG. 1 illustrates a waveshaping circuit 100 according to one embodiment of the present invention. A waveshaping circuit can be adapted to shape either single data streams or multiple input streams with multiple baseband signals. The waveshaping circuit 100 shown in FIG. 1 is adapted to shape a single input data stream to a single shaped output data stream. Other embodiments that are adapted to shape and to combine multiple input signals to a shaped output data stream are described later in connection with FIGS. 3, 4, 9, 10, 15, 16, and 17.

An input symbol stream 102 is applied as an input to the waveshaping circuit 100. The input symbol stream 102 can include data for cellular telephone communications, data communications, and the like. The waveshaping circuit 100 generates an output sample stream 104 as an output. Advantageously, the output of the waveshaping circuit 100 has a lower dynamic range than the input symbol stream 102. The lower dynamic range of the output sample stream 104 allows a base station to process and to amplify the output sample stream 104 with lower power and lower dynamic range components.

The waveshaping circuit 100 includes a preconditioning stage 106, a pulse-shaping and frequency translating circuit 108, and a post-conditioning circuit 110. The waveshaping circuit 100 can replace an upconversion circuit or portions of the waveshaping circuit 100 can be used to supplement existing upconversion circuits.

The preconditioning stage 106 includes a preconditioning circuit 112. In alternate embodiments, where multiple input baseband signals are shaped and combined, the preconditioning stage 106 can include multiple preconditioning circuits. The preconditioning circuit 112 applies nonlinear processing to the input symbol stream 102 on a symbol by symbol basis. In one embodiment, the preconditioning circuit 112 applies a soft nonlinear compression function, which severely compresses relatively extensive signal peaks and compresses relatively modest signal peaks into a predefined signal range. The output of the preconditioning circuit 112 is provided as an input to the pulse-shaping and frequency translating circuit 108. At this point in the data flow, bandwidth expansion is not a concern since the output of the preconditioning circuit 112 exhibits a white spectral characteristic. Further details of the preconditioning circuit 112 are described later in connection with FIGS. 5, 6, 7, and 8.

The illustrated pulse-shaping and frequency translating circuit 108 includes a pulse-shaping filter 114, a digital numerically controlled oscillator (NCO) 116, and a mixer 118. The pulse-shaping filter 114 maps the source bits of the output of the preconditioning circuit 112 to a baseband pulse. The output of the pulse-shaping filter 114 and an output of the digital NCO 116 are applied as inputs to the mixer 118. In one embodiment of the waveshaping circuit 100, the pulse-shaping and frequency translating circuit 108 is implemented with conventional components.

In a conventional base station without waveshaping, a sequence of input modulation symbols is streamed into a pulse-shaping filter and to a frequency upconversion circuit. The modulation symbols usually exhibit a white frequency spectral density and it is not until the symbol rate is stepped up to the higher sample stream rate by the pulse-shaping filter that the new modulation sample stream is band-limited by the actions of the filter. The baseband sample stream output of the pulse-shaping filter can be shifted to a new digital carrier frequency by multiplication with the output of the digital NCO. The input symbol stream 102 often is a composite of many symbol streams drawn from a number of active voice and data users. Consequently, on occasion, these symbol streams linearly (vectorially) add up to a relatively large signal peak when relatively many users simultaneously transmit a similar or identical modulation symbol.

The mere preconditioning of the input symbol stream 102 by the preconditioning circuit 112 does not adequately reduce peaks in the output of the mixer 118 due to Gibbs-type phenomena in the pulse-shaping filter 114. The Gibbs-type phenomena re-introduces signal peaks to the signal stream as a natural consequence of filtering.

In order to compensate for the signal peaks from the pulse-shaping filter 114, the waveshaping circuit 100 includes the post-conditioning circuit 110. The post-conditioning circuit 110 includes a pulse generator 120 and a summing circuit 122. The pulse generator 120 detects signal peaks and introduces via the summing circuit 122 a band-limited Gaussian pulse that destructively interferes with peaks in the output of the mixer 118 to reduce the peaks in the output sample stream 104. Although the destructive interference can temporarily undermine the waveform integrity of the output sample stream 104, the post-conditioning circuit 110 advantageously limits the upper peak values of the output sample stream 104 to a relatively precise dynamic range.

This transitory degradation in the integrity of the output sample stream 104 is tolerable, particularly in CDMA systems, because the introduced error energy is not de-spread in the signal recovery processing undertaken by the receiver. In one embodiment, the pulse generator 120 generates a Gaussian pulse or a family of Gaussian pulses to destructively interfere with the signal peaks in the output of the mixer 118. Advantageously, the error energy of a Gaussian pulse or family of Gaussian pulses is equally spread among W-CDMA spreading codes. In addition to their spectral characteristic, Gaussian pulses can be generated relatively easily and with relatively low latency. In other embodiments, the pulse generator 120 uses other types of band-limited pulse shapes such as Blackman pulses, Hamming pulses, Square Root Raised Cosine (SRRC) pulses, Raised Cosine (RC) pulses, Sinc pulses and the like to destructively interfere with and reduce the signal peaks. Further details of the post-conditioning circuit 110 are described later in connection with FIGS. 10 to 17.

Figure 2:
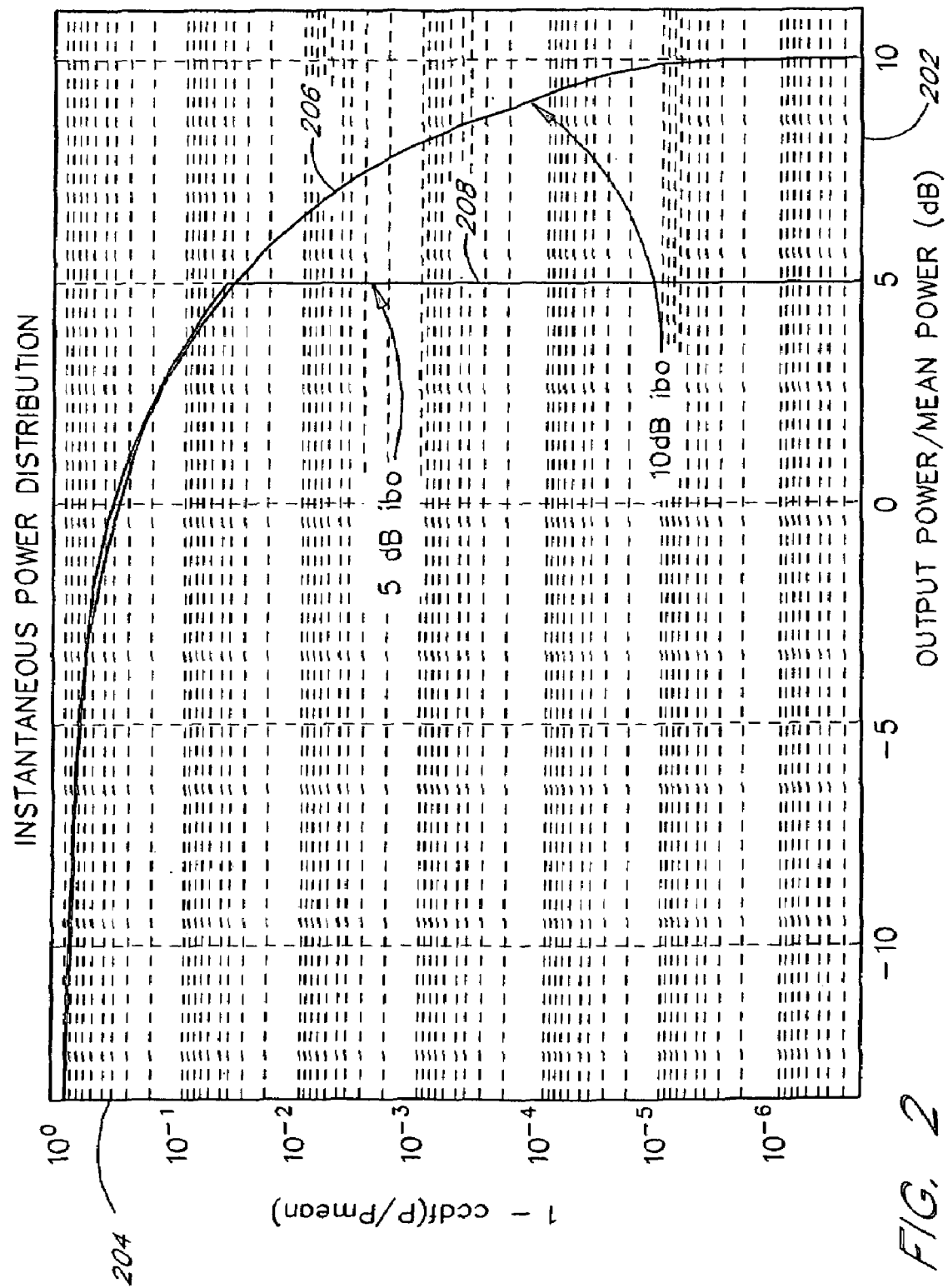
FIG. 2 illustrates a complementary cumulative distribution function (CCDF) curve for an intrinsic W-CDMA multicarrier signal.

FIG. 2 illustrates a complementary cumulative distribution function (CCDF) curve for an intrinsic W-CDMA multicarrier signal. The W-CDMA multicarrier signal is a multi-bearer waveform that includes a time variant random number of data and voice connections which, on relatively rare occasions, can co-align and generate a relatively large instantaneous signal peak. Although the relatively high amplitude signal peaks are relatively rare, the probability of the occurrence of the relatively high amplitude signal peaks is non-zero and should be accommodated by RF transmitters, base stations, and the like.

A horizontal axis 202 indicates output power relative to an average or mean power at 0 decibels (dB). A vertical axis 204 indicates the inverse probability (1−P) of the CCDF curve. The curves in FIG. 2 illustrate an example of the effects of peak power reduction by the destructive interference of a waveshaping circuit according to an embodiment of the present invention.

A first curve 206 corresponds to a typical, i.e., without waveshaping processing, CCDF curve with 10 dB of input back-off (ibo) for an intrinsic W-CDMA multicarrier signal. The first curve 206 illustrates that without waveshaping processing, signal levels that exceed 5 dB above the average signal level occur with a non-zero probability. Although the probability of such signal peaks is relatively low, the entire transmitter, which includes digital processors, analog upconverters, and power amplifiers, should accommodate such signal peaks.

A second curve 208 illustrates an example of the effects of waveshaping processing according to an embodiment of the present invention. The second curve 208 corresponds to a CCDF curve, where output signal peaks have been reduced through destructive interference by a waveshaping circuit to limit the signal peaks to a selected threshold. In the second curve 208, the selected threshold is about 5 dB above the mean power. The selected threshold can be varied to correspond to a broad range of values. In one embodiment, the selected threshold is fixed in a waveform shaping circuit. In another embodiment, a waveform shaping circuit monitors the incoming data sequences and adaptively adjusts the circuit's behavior to match with predetermined criteria. The reduction in signal peaks provided by embodiments of the present invention advantageously allows signals to be transmitted with more efficiency and with lower power and lower cost RF amplifiers.

Figure 3:
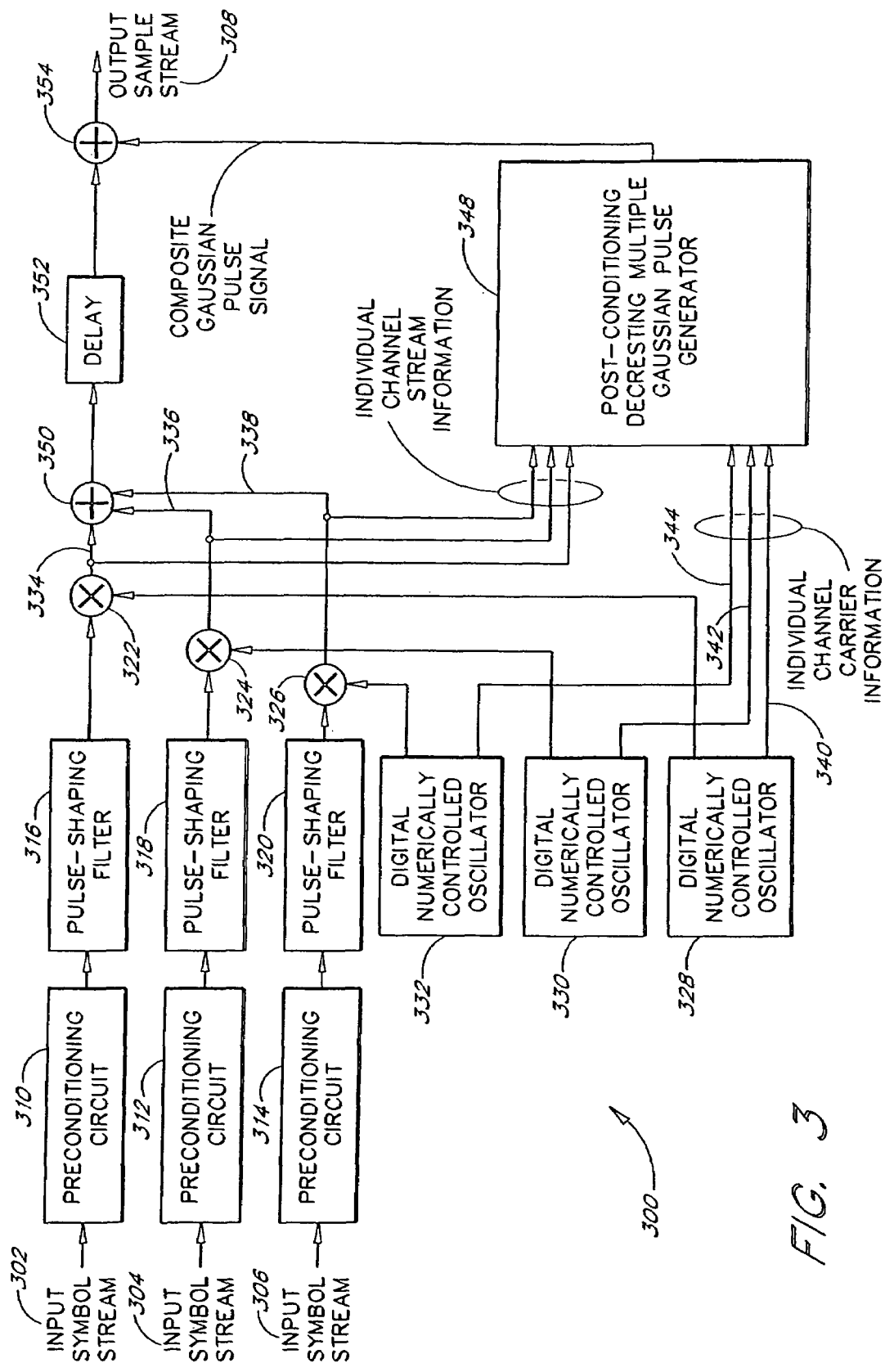
FIG. 3 illustrates a multi-carrier waveshaping circuit according to one embodiment of the present invention.

FIG. 3 illustrates a multi-carrier waveshaping circuit 300 according to one embodiment of the present invention, where the multi-carrier waveshaping circuit 300 is adapted to reduce relatively high amplitude signal peaks in a multi-carrier W-CDMA application. It will be understood by one of ordinary skill in the art that the number of carriers can vary over a broad range. The illustrated multi-carrier waveshaping circuit 300 of FIG. 3 is shown with 3 carriers.

The multi-carrier waveshaping circuit 300 receives a first input symbol stream 302, a second input symbol stream 304 and a third input symbol stream 306 as inputs. The multi-carrier waveshaping circuit 300 generates an output sample stream 308 by pulse-shaping, upconverting, combining, and waveshaping the input symbol streams.

The multi-carrier waveshaping circuit 300 includes a first preconditioning circuit 310, a second preconditioning circuit 312, a third preconditioning circuit 314, a first pulse-shaping filter 316, a second pulse-shaping filter 318, a third pulse-shaping filter 320, a first mixer 322, a second mixer 324, a third mixer 326, a first digital numerically controlled oscillator (NCO) 328, a second digital NCO 330, a third digital NCO 332, a post-conditioning pulse generator 348, a first summing circuit 350, a delay circuit 352, and a second summing circuit 354.

The first preconditioning circuit 310, the second preconditioning circuit 312, and the third preconditioning circuit 314 receive as inputs and process the first input symbol stream 302, the second input symbol stream 304 and the third input symbol stream 306, respectively, such that the peak to average ratio of each independent baseband input channel stream of modulation symbols is constrained within an initial level. One embodiment of a preconditioning circuit according to the present invention is described in greater detail later in connection with FIGS. 5 and 8.

The outputs of the first preconditioning circuit 310, the second preconditioning circuit 312, and the third preconditioning circuit 314, are applied as inputs to the first pulse-shaping filter 316, the second pulse-shaping filter 318, and the third pulse-shaping filter 320, respectively, which map the inputs to baseband symbol streams.

The baseband symbol streams are applied as inputs to the first mixer 322, the second mixer 324, and the third mixer 326. The first mixer 322, the second mixer 324, and the third mixer 326 mix the symbol streams with a first output 340, a second output 342, and a third output 344 of the first digital NCO 328, the second digital NCO 330, and the third digital NCO 332, respectively, to upconvert and to produce multiple streams of modulated channels. An output 334 of the first mixer 322, an output 336 of the second mixer 324, and an output 338 of the third mixer 326 are combined to a composite signal by the first summing circuit 350. In addition, the outputs 334, 336, 338 constructively interfere and destructively interfere with each other when combined. The constructive interference and the destructive interference can occur even where the signals that are combined are individually pre-compensated to limit high-amplitude signal peaks. As a result, the composite signal exhibits an even greater dynamic range with a significantly greater peak to average power ratio than a single modulated channel.

Embodiments of the present invention advantageously compensate for the relatively high-amplitude signal peaks in composite signals caused by constructive interference. In addition, embodiments of the present invention compensate for the relatively high-amplitude signal peaks with relatively little, if any, injection of signal energy to adjacent channel allocations. One embodiment that further advantageously detects destructive interference to at least partially disable the pre-compensation and the post-compensation applied to the input signals and to the composite signal is described later in connection with FIG. 9.

The post-conditioning pulse generator 348 compensates for the relatively high-amplitude signal peaks in the composite signal by generating multiple Gaussian pulses, which are selected to destructively interfere with relatively high-amplitude signal peaks in the composite signal. The post-conditioning pulse generator 348 receives as inputs the outputs 334, 336, 338 and analyzes the phase, frequency and amplitude of each respective channel carrier stream. This information permits the Gaussian pulse generator control to independently weigh a family of Gaussian pulses and to generate individual Gaussian pulses for each channel carrier stream, where each pulse is centered at the respective carrier frequency with a phase and amplitude selected to proportionally cancel the particular channel's contribution to the instantaneous composite signal's peak. The approach of utilizing multiple pulses is advantageous because signal energy is not injected into non-utilized adjacent channel allocations. Injection of signal energy to non-utilized adjacent channel allocations can undesirably interfere with other transmitters and systems. Further details of the post-conditioning pulse generator 348 are described later in connection with FIGS. 10-17.

The family of Gaussian pulses generated by the post-conditioning pulse generator 348 is applied as an input to the second summing circuit 354. The second summing circuit 354 sums the family of Gaussian pulses with an output of the delay circuit 352. The delay circuit 352 delays the composite signal from the first summing circuit 350 to align the composite signal with the Gaussian pulses generated by the post-conditioning pulse generator 348. In one embodiment, the delay circuit 352 delays the composite signal by the latency time associated with the post-conditioning pulse generator 348 minus the latency time associated with the first summing circuit 350. The delay circuit 352 can be implemented with cascaded flip-flops, delay lines, and the like. The second summing circuit 354 generates the output sample stream 308 as an output.

Waveshaping according to one embodiment of the present invention includes three processes: input preconditioning, pulse-shaping, and post-conditioning de-cresting. Although each process can be configured to operate independently within a waveshaping circuit, the operating parameters for each process are preferably selected to complement each other so that the waveshaping circuit as a whole functions optimally. In one embodiment, the operating parameters are selected a priori and remain static. In another embodiment, a global de-cresting control selects operating parameters adaptively and can adjust the operating parameters dynamically.

Figure 4:
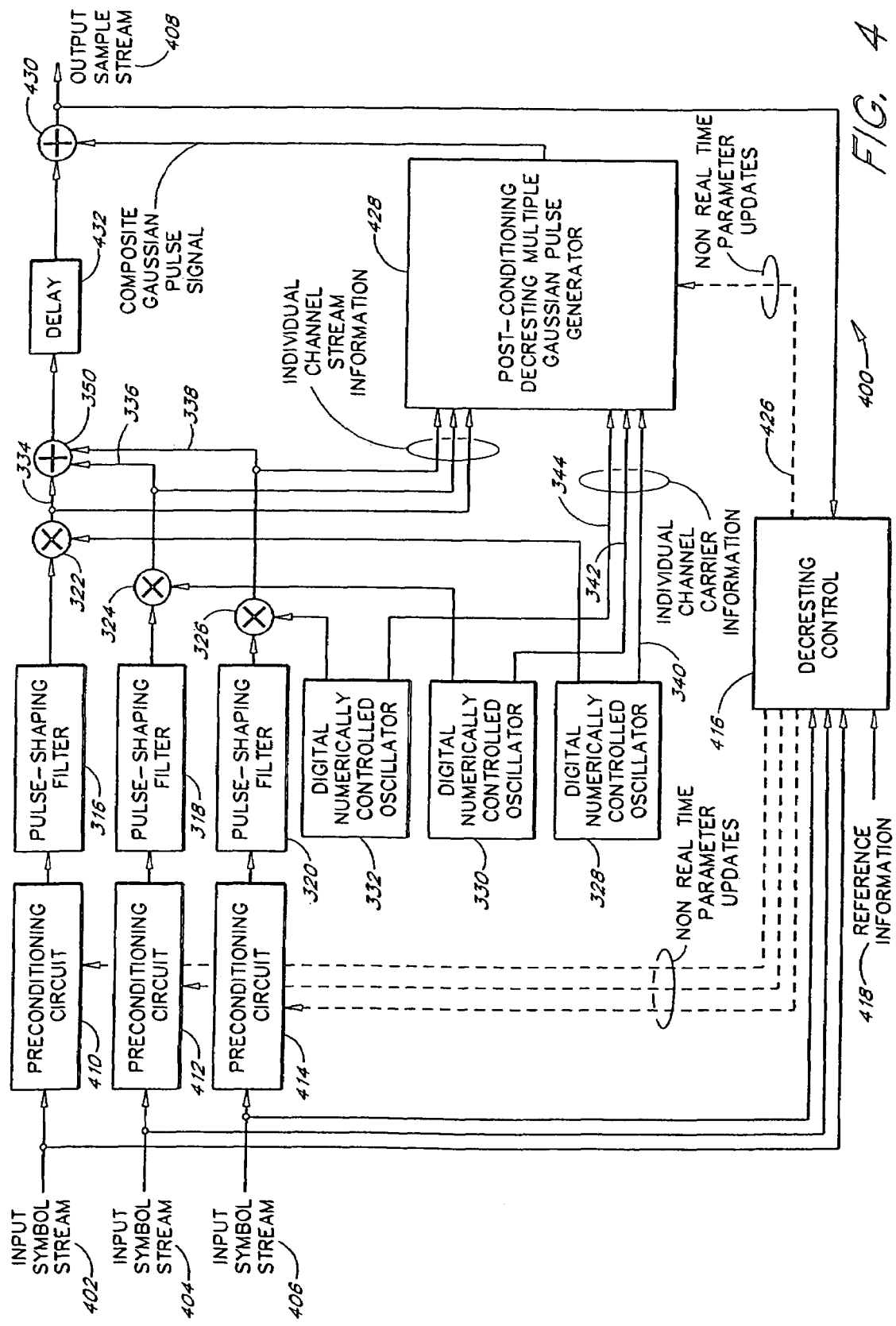
FIG. 4 illustrates a waveshaping circuit according to an embodiment of the present invention that adaptively modifies the waveshaping processing to fit predetermined criteria.

FIG. 4 illustrates a waveshaping circuit 400 according to an embodiment of the present invention that adaptively modifies the waveshaping processing to fit predetermined criteria. It will be understood by one of ordinary skill in the art that the number of individual input symbol streams processed by the waveshaping circuit 400 can vary over a broad range. The waveshaping circuit 400 shown in FIG. 4 is configured to process three such input symbol streams, which are a first input symbol stream 402, a second input symbol stream 404, and a third input symbol stream 406. As an output, the waveshaping circuit 400 generates an output sample stream 408.

The output sample stream 408 is advantageously monitored by a de-cresting control 416, which calculates and provides updates for the waveshaping circuit 400 to allow the waveshaping circuit to adapt the waveshaping processing to the input symbol stream. The de-cresting control 416 also monitors the first input symbol stream 402, the second input symbol stream 404, and the third input symbol stream 406. In addition, the de-cresting control 416 receives a reference information 418.

In response to the monitored input symbol streams 402, 404, 406, the monitored output sample stream 408, and the reference information 418, the de-cresting control 416 generates and provides parameter updates to the first preconditioning circuit 410, to the second preconditioning circuit 412, to the third preconditioning circuit 414, and to the post-conditioning pulse generator 428. The parameter updates can include updates to coefficients used in digital filters, such as a finite impulse response (FIR) filter.

The first preconditioning circuit 410, the second preconditioning circuit 412, the third preconditioning circuit 414, and the post-conditioning pulse generator 428 shown in FIG. 4 are similar to the first preconditioning circuit 310, the second preconditioning circuit 312, the third preconditioning circuit 314, and the post-conditioning pulse generator 348 described earlier in connection with FIG. 3. Further details of a preconditioning circuit are described later in connection with FIGS. 5, 7, and 8.

In one embodiment, the reference information 418 controls an amount of dynamic range compression by the waveshaping circuit 400. The reference information 418 can also be used to control a relative "hardness" or relative "softness" of limiting as described later in connection with FIG. 7. The de-cresting control 416 permits the overall performance of the waveshaping circuit 400 to be monitored and permits adjustments to be made to the parameters of individual, multiple or all of the sub-components of the waveshaping circuit 400. For example, the de-cresting control 416 can be used to adapt the processing of a waveshaping circuit to RF transmitters with a broad range of output power.

The de-cresting control 416 does not have to provide parameter updates in real time. In one embodiment, the de-cresting control 416 is implemented by firmware in a general purpose DSP or by a general-purpose microprocessor or microcontroller. In one embodiment, the general purpose DSP or the general purpose microprocessor resides in an external circuit and interfaces to the first preconditioning circuit 410, to the second preconditioning circuit 412, to the third preconditioning circuit 414, and to the post-conditioning pulse generator 428. In another embodiment, the de-cresting control 416, together with other components of the waveshaping circuit 400, is implemented with an application specific integrated circuit (ASIC) or with a field programmable gate array (FPGA).

Figure 5:
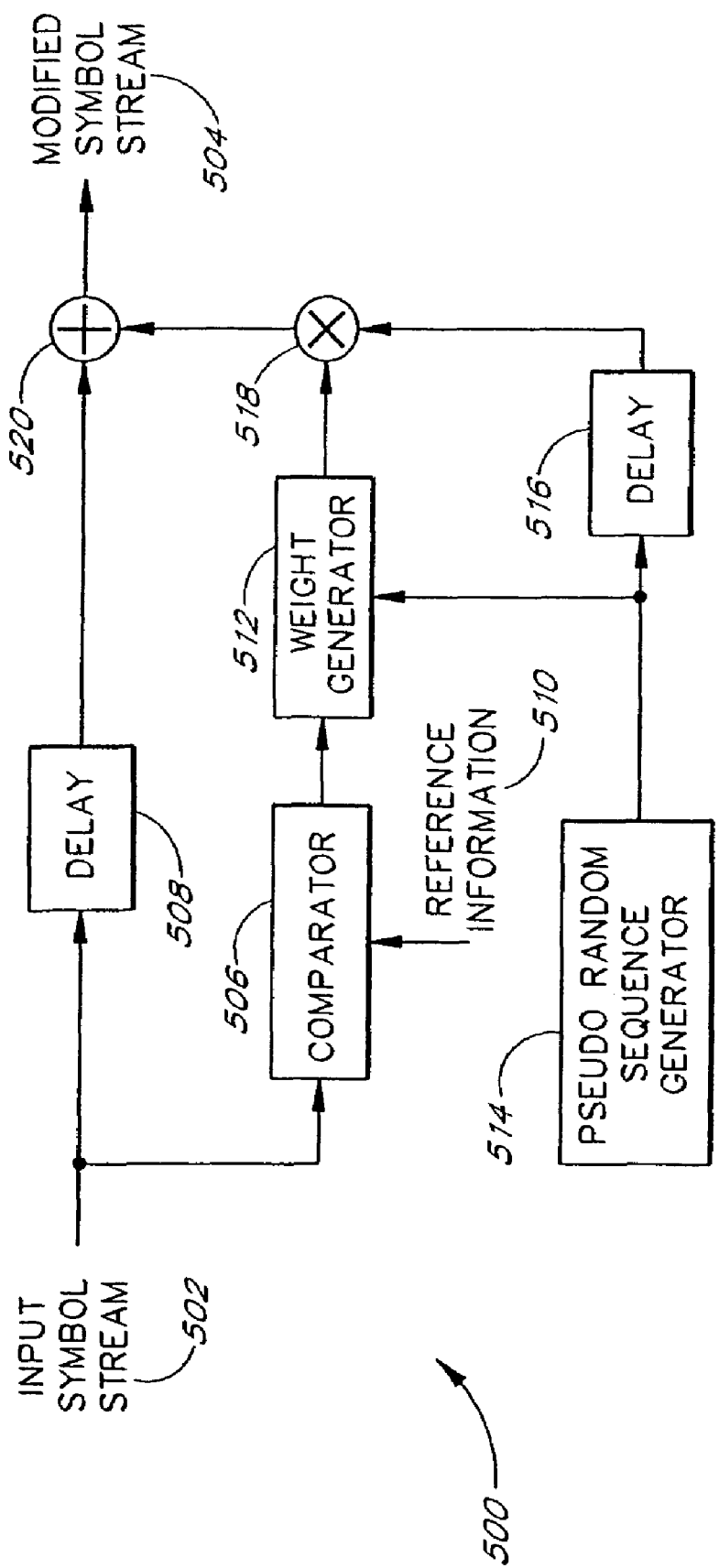
FIG. 5 illustrates a preconditioning circuit according to an embodiment of the present invention.

FIG. 5 illustrates a preconditioning circuit 500 according to an embodiment of the present invention. The preconditioning circuit 500 exploits the white spectral properties of an input symbol stream 502. The input symbol stream 502 includes a sequence of modulation symbol impulses or rectangular pulses and occupies a relatively wide frequency spectrum prior to pulse shaping by a pulse-shaping circuit. The subsequent pulse-shaping circuit filters a modified symbol stream 504 and provides the overall spectral shaping to apply the specified bandwidth constraints.

One embodiment of the preconditioning circuit 500 advantageously exploits the pulse shaping by the pulse-shaping circuit to modify the overall signal characteristics of the input symbol stream 502 by application of both linear and non-linear signal processing techniques. The spectral expansion induced by non-linear signal processing is later removed by the pulse-shaping circuit. In one embodiment, a subsequent post-conditioning circuit, such as a post-conditioning pulse generator, is not permitted to process in a manner that would expand the spectrum occupied by the processed signal. One embodiment of the post-conditioning circuit accordingly processes the applied signal with linear signal processing. However, exceptions are conceivable.

One embodiment of the preconditioning circuit 500 uses a pseudo random sequence of pulses that is weighted to destructively interfere with selected pulses of the input symbol stream 502 and to select an amount of destructive interference.

With reference to FIG. 5, the illustrated preconditioning circuit 500 includes a comparator 506, a first delay circuit 508, a weight generator 512, a pseudo random sequence generator 514, a second delay circuit 516, a multiplier 518, and a summing circuit 520. Further operational details of the preconditioning circuit 500 are also described later in connection with FIGS. 6A-E.

The input symbol stream 502 is applied as an input to the comparator 506 and to the first delay circuit 508. The comparator 506 detects the level of the instantaneous magnitude of the input symbol stream 502 and compares the level to a reference level information 510 to determine whether to apply signal preconditioning to the input symbol stream. The reference level information 510 can be used to indicate a threshold or a limit to the magnitude and/or phase of a signal peak. In one embodiment, the reference level information 510 is statically predetermined a priori and hard coded into the preconditioning circuit 500. In another embodiment, the reference level information 510 is adaptively provided by the de-cresting control, which can be an internal function or circuit of the waveshaping circuit or provided by a function or circuit external to the waveshaping circuit. When the comparison indicates that signal preconditioning is to be applied, the comparator 506 applies a correction vector as an input to the weight generator 512.

The weight generator 512 receives the correction vector from the comparator 506 and a pseudo random sequence from the pseudo random sequence generator 514. In response to the correction vector and the pseudo random sequence, the weight generator 512 computes a weight factor, which is applied as an input to the multiplier 518. The weight factor, when applied to the pseudo random sequence, generates the appropriate correction vector that is linearly added to a delayed version of the input symbol stream 502 to destructively interfere with relatively high-amplitude signal peaks in the input symbol stream 502. In one embodiment, the weight factor is a scalar quantity that depends on a complex value of the input symbol stream 502 and a complex value of the pseudo random sequence.

The second delay circuit 516 delays the pseudo random sequence from the pseudo random sequence generator 514 to align the pseudo random sequence with the weight factor from the weight generator. The weight factor and the delayed pseudo random sequence are multiplied together by the multiplier 518 to generate the correction impulses.

The input symbol stream 502 is delayed by the first delay circuit 508. The first delay circuit 508 is configured to delay the input symbol stream 502 such that the input symbol stream 502 aligns with the correction impulses. In one embodiment, the first delay circuit 508 delays the input symbol stream 502 by an amount of time approximately equal to the latency of the comparator 506, the weight generator 512, and the multiplier 518. The delays provide the preconditioning circuit 500 with time to determine whether a modifying impulse or pulse is to be introduced into the data flow in order to reduce a relatively high signal peak or crest in the data sequence and to determine an amount of a reduction in the magnitude and/or phase of the crest.

The delayed input symbol stream from the first delay circuit 508 is linearly summed by the summing circuit 520 with the correction impulses from the multiplier 518. The linear superposition of the summing circuit 520 generates the modified symbol stream 504 as an output. The relatively high signal peaks in the input symbol stream 502 are reduced in the modified symbol stream 504 by destructive interference of the input symbol stream 502 with the correction impulses.

Advantageously, the illustrated preconditioning circuit 500 can produce both phase variations and amplitude variations in the input symbol stream 502 to de-crest the input symbol stream 502. The ability to provide a phase variation finds particular utility in multi-carrier applications, as will be described in connection with FIGS. 3, 4, 9, and 10.

FIGS. 6A-E illustrate an example of the operation of the preconditioning circuit 500 illustrated in FIG. 5. For clarity, the example shown in FIGS. 6A-E is drawn with the input symbol stream 502 and the pseudo random sequence represented as scalar quantities. It will be understood by one of ordinary skill in the art that both the input symbol stream 502 and the pseudo random sequence are generally complex quantities with both magnitude and phase. Also for clarity, the example shown in FIGS. 6A-E does not show the delay in the first delay circuit 508 and in the second delay circuit 516.

Figure 6A:
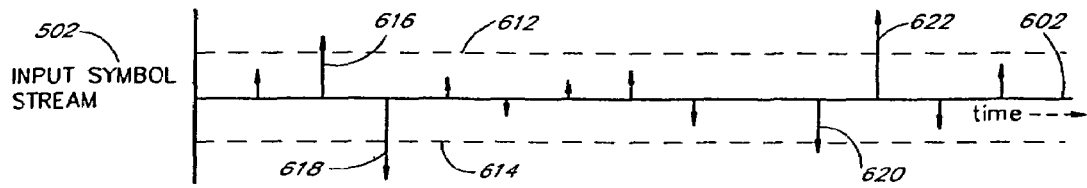
FIGS. 6A-E illustrate an example of the operation of the preconditioning circuit shown in FIG. 5.

In FIGS. 6A-E, a plurality of horizontal axes 602, 604, 606, 608, 610 indicate time. FIG. 6A illustrates an example of the input symbol stream 502, which is applied as an input to the preconditioning circuit 500. Dashed lines 612, 614 indicate a predetermined threshold level. For example, the predetermined threshold level can correspond to a peak output power level of an associated RF transmitter. In the example, four events 616, 618, 620, 622 exceed the predetermined threshold level.

Figure 6B:
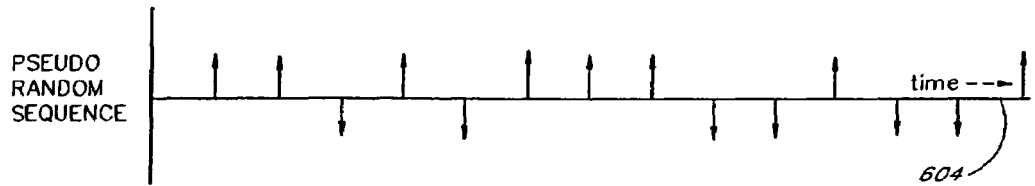
Figure 6C:
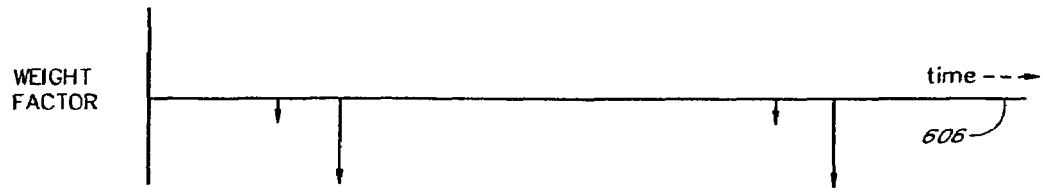
Figure 6D:

FIG. 6B illustrates a time aligned pseudo random sequence of constant amplitude signal pulses from the pseudo random sequence generator 514. FIG. 6C illustrates a sequence of weight factors that are calculated by the weight generator 512. The weight factors are applied to the pseudo random sequence to generate the correction impulses. FIG. 6D illustrates a sequence of the correction impulses for the preconditioning circuit 500.

Figure 6E:
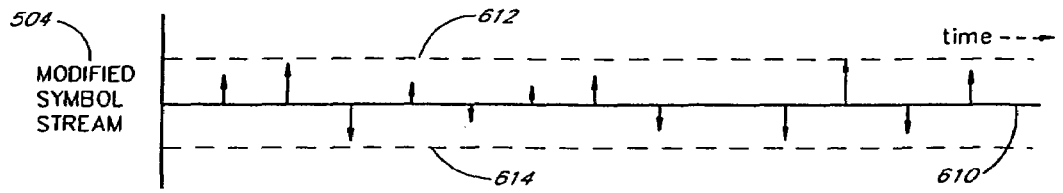

FIG. 6E illustrates the modified symbol stream 504. The modified symbol stream 504 is the time-aligned linear superposition of the input symbol stream 502 with the correction impulses. The correction impulses destructively interfere with the four events 616, 618, 620, 622 shown in FIG. 6A so that an output level of the modified symbol stream 504 shown in FIG. 6E remains at or below the predetermined threshold level as shown by the dashed lines 612, 614. In one embodiment, the preconditioning circuit 500 applies correction impulses to the input symbol stream 502 such that the modified symbol stream 504 does not transgress beyond a selected signal level threshold.

Figure 7:
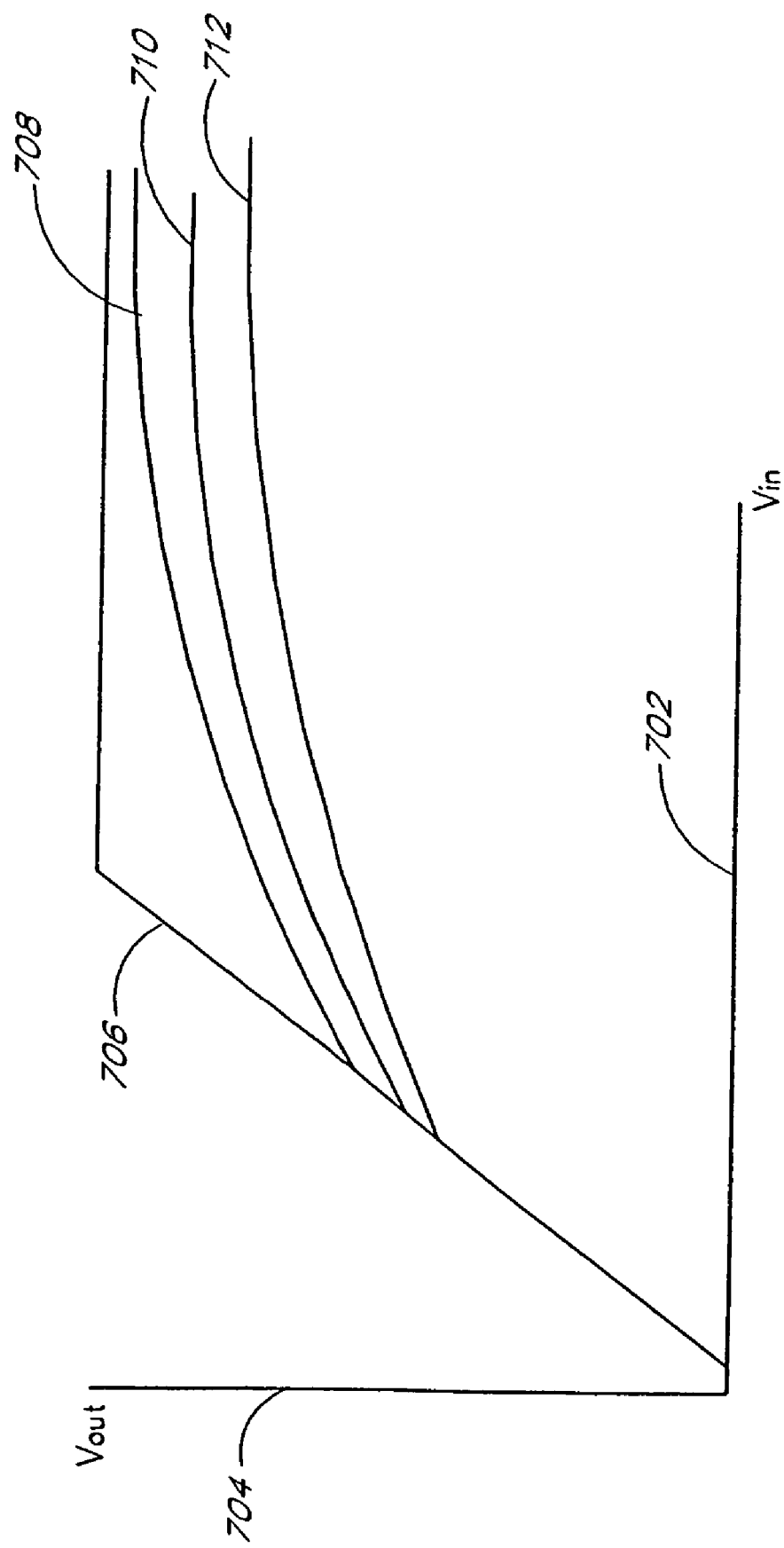
FIG. 7 graphically represents limiting with a relatively soft signal level threshold and limiting with a relatively hard signal level threshold.

FIG. 7 graphically represents limiting with a relatively soft signal level threshold and limiting with a relatively hard signal level threshold. A horizontal axis 702 indicates an input level. A vertical axis 704 indicates an output level.

A first trace 706 corresponds to limiting with a relatively hard signal level threshold. In practice, the use of a single hard signal level threshold is not appropriate because the resulting complementary cumulative distribution function (CCDF) of the signal, as described earlier in connection with FIG. 2, will not exhibit a smooth transition but rather an abrupt or rapid "cliff." Such an approach often results in an unacceptably high error rate in the downstream receiver.

The preconditioning circuits according to the present invention advantageously overcome the disadvantages of relatively hard signal level thresholding by employing a non-linear weighting function that provides a varying amount of correction depending upon the magnitude of the input data stream. A second trace 708, a third trace 710, and a fourth trace 712 represent exemplary transfer functions associated with a relatively soft signal-leveling threshold.

This approach of soft weighting eliminates the rapid onset of a "cliff" in the CCDF and replaces the abrupt cliff with a relatively soft region in which the probability of a signal level exceeding a predetermined signal level is significantly less than that exhibited by the intrinsic input symbol stream. At relatively high signal levels, the non-linear weighting function approaches a hard threshold, and a delay "cliff" in the signal's CCDF occurs. The soft weighting approach does, however, provide a significant decrease in the level of error energy observed by the downstream receivers.

The preconditioning circuit 500 operates by deliberately manipulating the amplitude and phase probability density function of the input signal waveform so that the peak to average of the input signal's impulse stream is significantly lower than the original input waveform. In practice, any function or non-linear equation that exhibits behavior which incurs desirable changes in the weight calculation can be employed by the preconditioning circuit 500. In one embodiment, the non-linear weighting function is expressed by Equation 1. In addition, the deliberate insertion of Amplitude Modulation (AM), Phase Modulation (PM), or both can require an alternative function.

Equation 1 defines a family of soft preconditioning weighting functions. Equation 1 includes parameters α and β, which correspond to the degree of non-linearity invoked.

$$V_m(t) = \frac{|V_m(t)|}{\left(1 + \left(\frac{|V_m(t)|}{\beta}\right)^\alpha\right)^{1/\alpha}} e^{j(\arg(V_m(t)))} \qquad \text{Eq. 1}$$

As α increases, the gain of the function increases, which permits an overall level of preconditioning to be defined. Manipulation of β permits the rate at which a hard clipping level is set.

Figure 8:
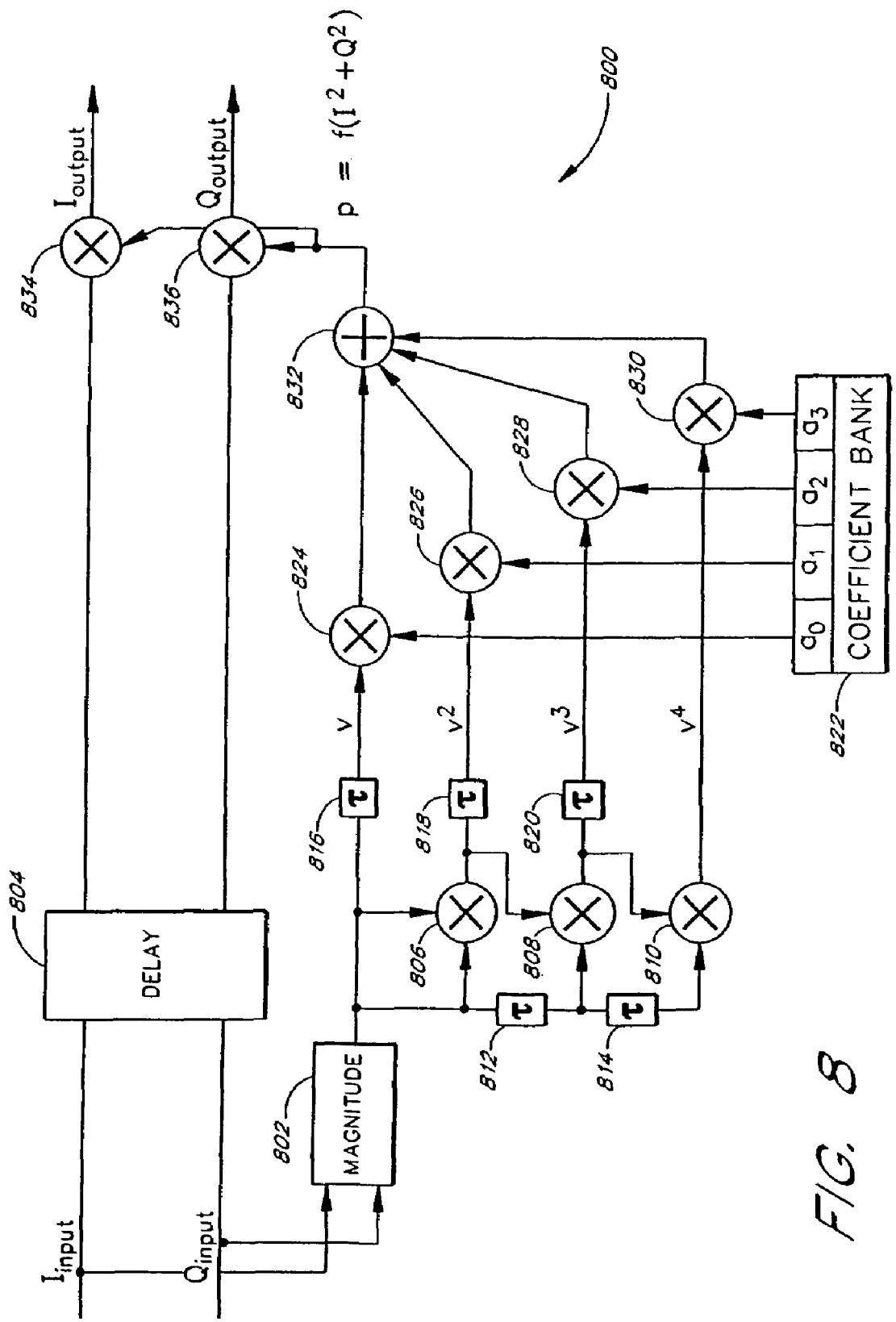
FIG. 8 illustrates another preconditioning circuit according to an embodiment of the present invention.

FIG. 8 illustrates another preconditioning circuit 800 according to an embodiment of the present invention. The illustrated preconditioning circuit 800 uses multipliers and coefficients to calculate a Taylor series expansion of the non-linear weighting function shown in Equation 1.

The approximation of the non-linear weighting function by the Taylor series expansion includes at least three engineering compromises: delay latency, power consumption, and precision of the Taylor series approximation. The delay latency of the preconditioning circuit 800 increases as a function of the order of the Taylor series expansion, i.e., increases with the number of multiplier stages. The power consumption of the preconditioning circuit 800 increases as the number of multipliers is increased. The weighting function is less closely approximated by the Taylor series expansion, where fewer terms of the Taylor series expansion are computed.

The Taylor series approximation approach uses relatively extensive delay balancing between each of the signal processing paths to ensure that the calculated preconditioning function, represented in FIG. 8 as "p," applies to the appropriate input samples. The illustrated preconditioning circuit 800 computes the Taylor series expansion to the fourth order. It will be understood by one of ordinary skill in the art that the preconditioning circuit 800 can be implemented in software as well as in hardware.

The illustrated preconditioning circuit 800 includes a magnitude computation circuit 802, a first delay circuit 804, a first multiplier 806, a second multiplier 808, a third multiplier 810, a second delay circuit 812, a third delay circuit 814, a fourth delay circuit 816, a fifth delay circuit 818, a sixth delay circuit 820, a coefficient bank 822, a fourth multiplier 824, a fifth multiplier 826, a sixth multiplier 828, a seventh multiplier 830, a summing circuit 832, an eighth multiplier 834, and a ninth multiplier 836.

Generally, the input symbol stream is complex, with both an in-phase component and a quadrature-phase component. The in-phase component of the input symbol stream, $I_{input}$, is applied as an input to the magnitude computation circuit 802 and to the first delay circuit 804. The quadrature phase component of the input symbol stream, $Q_{input}$, is applied as an input to the magnitude computation circuit 802 and to the first delay circuit 804. The magnitude computation circuit 802 computes the magnitude of the input symbol stream. In one embodiment, the computed magnitude corresponds approximately to a sum of squares.

An output of the magnitude computation circuit 802, termed "magnitude," is applied as an input to the first multiplier 806, the second delay circuit 812, and the fourth delay circuit 816. The first multiplier 806 multiplies the magnitude by itself to produce a square of the magnitude as an output. The output of the first multiplier 806 is applied as an input to the second multiplier 808 and to the fifth delay circuit 818.

The second multiplier 808 receives and multiplies the output of the first multiplier 806 and an output of the second delay circuit 812. The second delay circuit 812 delays the magnitude or the output of the magnitude computation circuit 802 by a latency associated with the first multiplier 806. The second multiplier 808 multiplies the squared magnitude from the first multiplier 806 with the first delayed magnitude from the second delay circuit 812 to generate a cubed magnitude.

The cubed magnitude output of the second multiplier is applied as an input to the third multiplier 810 and to the sixth delay circuit 820. The first delayed magnitude output of the second delay circuit 812 is applied as an input to the third delay circuit 814, which generates a second delayed magnitude. The second delayed magnitude from the third delay circuit 814 and the cubed magnitude from the second multiplier 808 are provided as inputs to the third multiplier 810. The third multiplier 810 generates an output, which corresponds to the magnitude raised to the fourth power.

The output of the third multiplier 810 is provided as an input to the seventh multiplier 830. The output of the third multiplier 810 is delayed from the magnitude output of the magnitude computation circuit 802 by the sum of the latency time of the first multiplier 806, the latency time of the second multiplier 808, and latency time of the third multiplier 810. The sixth delay circuit 820, the fifth delay circuit 818, and the fourth delay circuit 816 delay samples such that Taylor series expansion terms combined by the summing circuit 832 correspond to the same sample.

The sixth delay circuit 820 delays the magnitude cubed output of the second multiplier 808 by the latency time of the third multiplier 810 to time align the magnitude cubed output with the magnitude to the fourth power of the third multiplier 810.

The fifth delay circuit 818 delays the magnitude squared output of the first multiplier 806 by the sum of the latency time of the second multiplier 808 and the latency time of the third multiplier 810. The fifth delay circuit 818 time aligns the magnitude squared output of the first multiplier 806 with the magnitude to the fourth power output of the third multiplier 810.

The fourth delay circuit 816 delays the magnitude output of the magnitude computation circuit 802 approximately by the sum of the latency time of the first multiplier 806, the latency time of the second multiplier 808, and the latency time of the third multiplier 810. It will be understood by one of ordinary skill in the art that the fourth delay circuit 816, the fifth delay circuit 818, and the sixth delay circuit 820 can be placed in the signal path either before or after the fourth multiplier 824, the fifth multiplier 826, and the sixth multiplier 828, respectively.

The fourth multiplier 824, the fifth multiplier 826, the sixth multiplier 828, and the seventh multiplier 830 compute the individual terms of the Taylor series expansion. The coefficient bank 822 stores the coefficients of the Taylor series expansion. The coefficients are applied as inputs to the fourth multiplier 824, to the fifth multiplier 826, to the sixth multiplier 828, and to the seventh multiplier 830. The outputs of the fourth delay circuit 816, the fifth delay circuit 818, the sixth delay circuit 820 and the third multiplier 810 are also applied as inputs to the fourth multiplier 824, the fifth multiplier 826, the sixth multiplier 828, and the seventh multiplier 830, respectively. In one embodiment, the latency times of the fourth multiplier 824, the fifth multiplier 826, the sixth multiplier 828, and the seventh multiplier 830 are approximately equal.

The outputs of the fourth multiplier 824, the fifth multiplier 826, the sixth multiplier 828, and the seventh multiplier 830 are provided as inputs to the summing circuit 832 to compute the Taylor series expansion of the preconditioning function. The output of the summing circuit 832 is provided as an input to the eighth multiplier 834 and to the ninth multiplier 836. The outputs of the first delay circuit 804 are also provided as inputs to the eighth multiplier 834 and to the ninth multiplier 836.

The first delay circuit 804 delays the in-phase component of the input symbol stream and the quadrature-phase component of the input symbol stream to time align the in-phase component and the quadrature-phase component with the corresponding preconditioning function as provided by computation of the Taylor series expansion. In one embodiment, the delay of the first delay circuit 804 is approximately the sum of the latency time of the magnitude computation circuit 802, the latency time of the first multiplier 806, the latency time of the second multiplier 808, the latency time of the third multiplier 810, the latency time of the seventh multiplier 830, and the latency time of the summing circuit 832.

The preconditioning circuit 800 illustrated in FIG. 8 can be implemented in hardware or by software. For example, where the data rate is relatively low, the preconditioning circuit 800 can be implemented by software running on a general-purpose digital signal processor (DSP) or a microprocessor. In a relatively wideband application, the preconditioning circuit 800 can be fabricated in dedicated hardware with, for example, a field programmable gate array (FPGA) or with an application specific integrated circuit (ASIC).

FIG. 9 illustrates another waveshaping circuit 900 according to one embodiment of the present invention. The waveshaping circuit 900 receives multiple input symbol streams and advantageously detects when the multiple input symbol streams fortuitously destructively interfere with each other such that an amount of preconditioning applied to the individual input symbol streams can be decreased or eliminated.

In the multi-carrier waveshaping circuit 300 and the waveshaping circuit 400 described earlier in connection with FIGS. 3 and 4, respectively, an individual preconditioning circuit independently applies preconditioning to limit a relatively high signal peak in its respective input symbol stream. However, where multiple input symbol streams are eventually combined, such as by the first summing circuit 350 described in connection with FIGS. 3 and 4, the multiple input symbol streams may on occasion destructively interfere with each other. On these occasions, the preconditioning applied to relatively high signal peaks in the input symbol streams can be decreased or eliminated, thereby reducing or eliminating the associated injection of error energy that otherwise would have been injected into the composite multicarrier waveform stream by the preconditioning circuits and the post-conditioning circuit.

For illustrative purposes, the waveshaping circuit 900 shown in FIG. 9 processes three input symbol streams. However, it will be understood by one of ordinary skill in the art that the number of input symbol streams processed by embodiments of the present invention is arbitrary. A broad range of input symbol streams can be processed by embodiments of the present invention.

The illustrated waveshaping circuit 900 includes the first pulse-shaping filter 316, the second pulse-shaping filter 318, the third pulse-shaping filter 320, the first mixer 322, the second mixer 324, the third mixer 326, the first digital NCO 328, the second digital NCO 330, the third digital NCO 332, and the first summing circuit 350 described earlier in connection with FIG. 3. The waveshaping circuit 900 further includes a first preconditioning circuit 910, a second preconditioning circuit 912, a third preconditioning circuit 914, a crest predictive weight generator 916, a post-conditioning pulse generator 928, a second summing circuit 930, and a delay circuit 932.

A first input symbol stream 902, a second input symbol stream 904, and a third input symbol stream 906 are applied as inputs to the first preconditioning circuit 910, the second preconditioning circuit 912, the third preconditioning circuit 914, respectively, and to the crest predictive weight generator 916. The first preconditioning circuit 910, the second preconditioning circuit 912, the third preconditioning circuit 914, respectively, and to the crest predictive weight generator 916 can be similar to the preconditioning circuits described in connection with FIGS. 5 and 8.

A digital NCO phase information 934, a second digital NCO phase information 936, and a third digital phase information 938 from the first digital NCO 328, the second digital NCO 330, and the third digital NCO 332, respectively, are applied as inputs to the crest predictive weight generator 916. The phase information allows the crest predictive weight generator 916 to determine how the input symbol streams will combine. The crest predictive weight generator 916 can use pulse-shaping filters to predict how the input symbol streams will combine. In one embodiment, the length, the latency, or both the latency and the length of the pulse-shaping filters of the crest predictive weight generator 916 is less than the length, the latency, or both the latency and the length of the pulse-shaping filters 316, 318, 320.

The crest predictive weight generator 916 examines the multiple information symbol streams and the corresponding phases of the digital numerical controlled oscillators to determine or to predict whether a relatively high-level signal crest will subsequently occur in the combined signal. When the crest predictive weight generator 916 predicts that a relatively high-amplitude signal crest will occur in the combined signal, the crest predictive weight generator 916 provides weight values to the pre-conditioning circuits that allow the preconditioning circuits to individually process their respective input symbol streams to reduce the relatively high amplitude signal peaks. When the crest predictive weight generator 916 predicts that destructive interference between the symbol streams themselves will reduce or will eliminate the relatively high-level signal crest, the crest predictive weight generator 916 provides weight values to the preconditioning circuits that reduce or disable the preconditioning applied by the preconditioning circuits.

The crest predictive weight generator 916 can optionally provide an advanced crest occurrence information 940 to the post-conditioning pulse generator 928. The advanced crest occurrence information 940 can advantageously be used to reduce computation latency in the waveshaping circuit 900 by allowing the post-conditioning pulse generator 928 to initiate early production of band-limited pulses, such as Gaussian pulses, which are applied to destructively interfere with a composite signal output of the delay circuit 932. In other aspects, one embodiment of the post-conditioning pulse generator 928 is similar to the post-conditioning pulse generator 348 described earlier in connection with FIG. 3.

One embodiment of the crest predictive weight generator 916 provides the weight value as a binary value with a first state and a second state. For example, in the first state, the crest predictive weight generator 916 allows waveshaping, and in the second state, the crest predictive weight generator 916 disables waveshaping. The crest predictive weight generator 916 provides the weight value or values to the preconditioning circuits and the crest occurrence information to the post-conditioning circuit in real time and not in non-real time. By contrast, the de-cresting control 416 described in connection with FIG. 4 can provide parameter updates to preconditioning and to post-conditioning circuits in either real time or in non-real time. In one embodiment, a waveshaping circuit includes both the crest predictive weight generator 916 and the de-cresting control 416.

The advanced crest occurrence information 940 allows the crest predictive weight generator 916 to notify the post-conditioning pulse generator 928 of when the input symbol streams at least partially destructively interfere when combined. This allows the post-conditioning pulse generator to correspondingly decrease the magnitude of the band-limited pulse or to eliminate the band-limited pulse that would otherwise be applied by the post-conditioning pulse generator 928 to the composite signal to reduce relatively high-amplitude signal peaks.

In one embodiment, the first preconditioning circuit 910, the second preconditioning circuit 912, and the third preconditioning circuit 914 are adapted to receive weight values 920, 922, 924 from the crest predictive weight generator 916 and are also adapted to modify the preconditioning according to the received weight values. In one embodiment, the weight values 920, 922, 924 are the same for each preconditioning circuit and can be provided on a single signal line. In another embodiment, the weight values 920, 922, 924 are individually tailored for each preconditioning circuit.

The preconditioning circuit 500 described in connection with FIG. 5 can be modified to be used for the first preconditioning circuit 910, the second preconditioning circuit 912, or the third preconditioning circuit 914 by allowing the applied weight value provided by the crest predictive weight generator 916 to vary the weight applied by the weight generator 512. In another embodiment, the weight value from the crest predictive weight generator 916 disables the summation of the input symbol stream 502 with the correction impulse by, for example, partially disabling the summing circuit 520, disabling the multiplier 518, or by otherwise effectively zeroing the correction impulse.

The preconditioning circuit 800 described in connection with FIG. 8 can also be modified to be used for the first preconditioning circuit 910, the second preconditioning circuit 912, and the third preconditioning circuit 914. For example, when the amount of preconditioning is decreased, the weight values applied to the preconditioning circuit 800 can be used to select alternative coefficients in the coefficient bank 822. The weight values can also be used to decrease a magnitude of the applied preconditioning by, for example, attenuating the output of the summing circuit 832. Where the preconditioning is disabled, the weight value can be used to disable a portion of the preconditioning circuit 800, such as the summing circuit 832 or the eighth multiplier 834 and the ninth multiplier 836, to disable the preconditioning.

The waveshaping circuit 900 can further include an additional delay circuit to compensate for computational latency in the crest predictive weight generator 916. In one embodiment, the first preconditioning circuit 910, the second preconditioning circuit 912, and the third preconditioning circuit 914 include the additional delay circuit.

In addition to detecting when the input symbol streams destructively interfere with each other so that an amount of waveshaping can be reduced or eliminated, one embodiment of the crest predictive weight generator 916 advantageously detects when a relatively short transitory sequence of impulses or pulses from the information source sequentially exhibits similar amplitude and phase levels and would otherwise give rise to a relatively large crest.

Pulse-shaping filters, such as the first pulse-shaping filter 316, the second pulse-shaping filter 318, and the third pulse-shaping filter 320, limit the spectral occupancy of impulse and pulse information-bearing data streams in communication systems. A deleterious characteristic of these filters is that the peak to average of the pulse or impulse stream is invariably expanded during the pulse-shaping process, often by in excess of 3 dB. These newly introduced signal crests are generally attributed to Gibbs filter ringing effects. Ordinarily, relatively large crests occur when a relatively short transitory sequences of impulses or pulses from the information sources sequentially exhibit similar amplitude and phase levels. These scenarios may be advantageously predicted by the crest predictive weight generator 916.

Upon detection of the relatively short transitory sequence of impulses or pulses that sequentially exhibit similar amplitude and phase levels, the crest predictive weight generator 916 selects compensation with a sequence of corrective vectors rather than compensation with a single corrective vector. This distributes the introduction of error energy over a short sequence of modulation symbols rather than to a single symbol. In systems that do not exploit code division multiple access (CDMA), such as Enhanced Data GSM Environment (EDGE), the distribution of the error energy is desirable because it mitigates against the impact of error energy upon the downstream receiver's detector error rate.

Figure 10B:
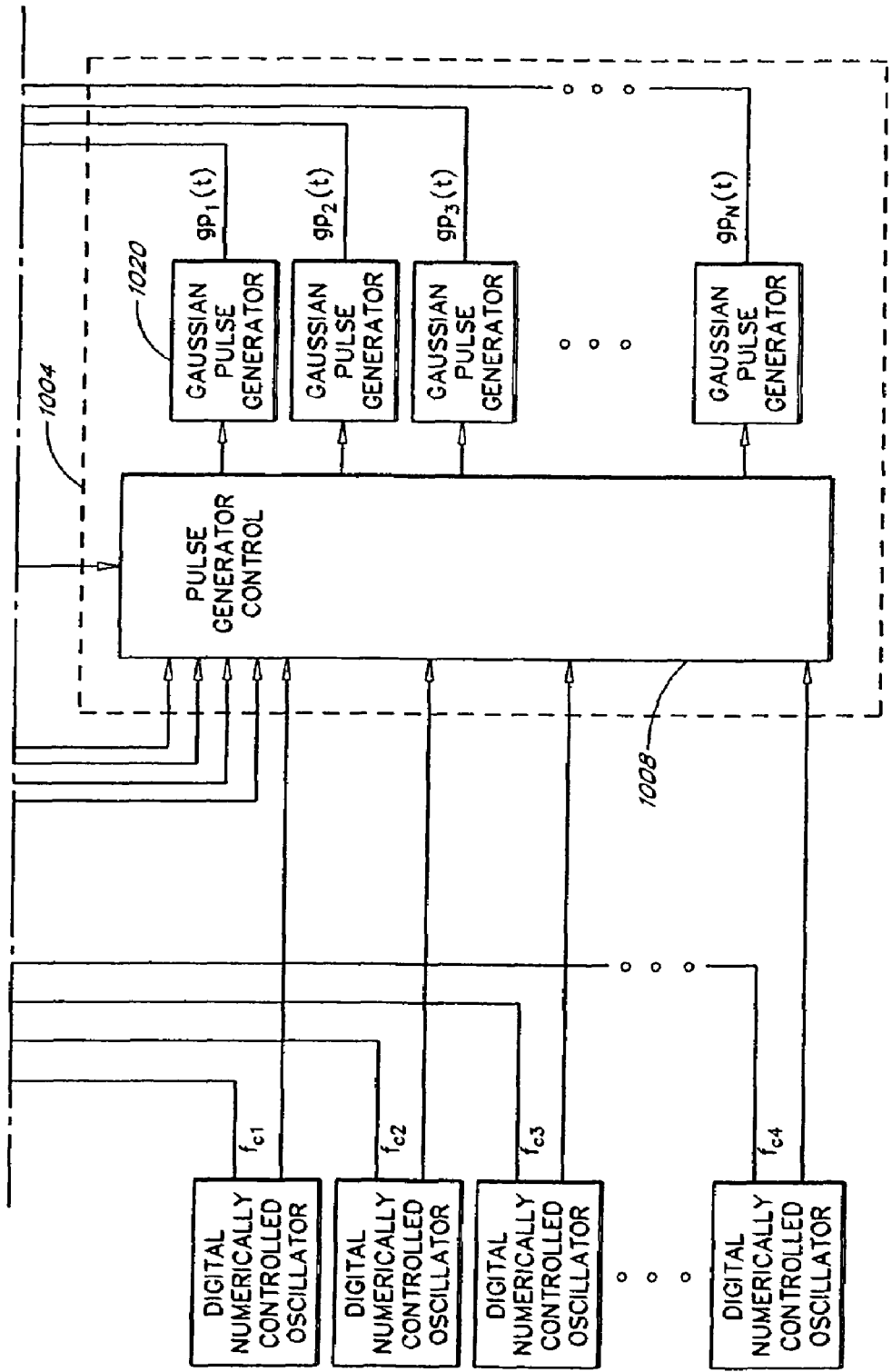
FIG. 10 consists of FIGS. 10A and 10B and illustrates a multicarrier de-cresting circuit according to an embodiment of the present invention.

FIG. 10 illustrates further details of a multicarrier de-cresting circuit 1000 according to an embodiment of the present invention. The illustrated multicarrier de-cresting circuit 1000 does not include pre-conditioning of the input symbol streams.

The multicarrier de-cresting circuit 1000 shown in FIG. 10 includes a multiple channel circuit 1002, a de-cresting pulse generation circuit 1004, and a de-cresting combiner 1006. The multiple channel circuit 1002 pulse-shapes, upconverts, and combines multiple input symbol streams. In one embodiment of the multicarrier de-cresting circuit 1000, the multiple channel circuit 1002 corresponds to a conventional circuit. Another embodiment of the multicarrier de-cresting circuit 1000 uses a multiple channel circuit described in greater detail later in connection with FIG. 16.

The de-cresting pulse generation circuit 1004 generates carrier waveforms and generates post-compensation band-limited de-cresting pulses. A pulse generator control 1008 receives and inspects a composite multicarrier signal $M_c(t)$ 1010, individual subcarrier signals (or baseband equivalents), and digital NCO waveforms. This permits the pulse generator control 1008 to determine the requirement for, the total number of, the duration, the frequency, the amplitude and the phase of band-limited pulses that are to be injected into the transmission data stream to reduce or to eliminate relatively high amplitude peaks in the composite multicarrier signal 1010. In one embodiment, the band-limited pulses are Gaussian pulses that are provided by a bank of generalized Gaussian pulse generators that accept commands from the pulse generator control 1008 to generate a pulse of a specific duration, phase, amplitude and center frequency. Further details of the de-cresting pulse generation circuit 1004 are described later in connection with FIG. 15. Further details of the pulse generator control 1008 are described later in connection with FIGS. 13A-E.

The de-cresting combiner 1006 combines the upconverted input symbol streams with the post-compensation band-limited de-cresting pulses to remove the relatively high-level signal crests from the combined input symbol streams. The de-cresting combiner 1006 includes a time delay circuit 1012. The time delay circuit 1012 delays the composite multicarrier signal 1010 to a time-delayed composite multicarrier signal 1016. The delay of the time delay circuit 1012 is matched to the corresponding delay in the de-cresting pulse generation circuit 1004 so that a desired amount of destructive interference can be reliably induced. An output of the time delay circuit 1012 is provided as an input to a multi-input summing junction 1014, which provides a de-crested composite multicarrier signal 1018 as the linear sum of the composite multicarrier signal 1010, as delayed by the time delay circuit 1012, and a collection of band-limited pulses. It will be understood by one of ordinary skill in the art that the band-limited pulses can be individually applied to the multi-input summing junction 1014 or the band-limited pulses can be combined to a composite pulse stream and then applied to the multi-input summing junction 1014.

In one embodiment, the band-limited pulses are Gaussian pulses. The collection of Gaussian pulses can include zero, one, or multiple pulses depending on the instantaneous magnitude of the composite multicarrier signal 1010.

Figure 11A:
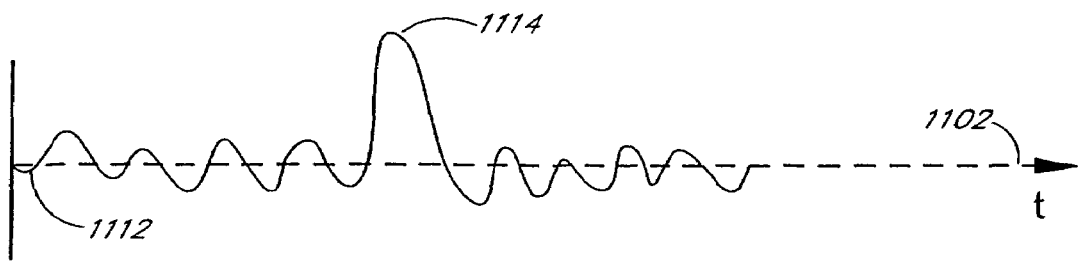
FIGS. 11A-E illustrate an example of the operation of the multicarrier de-cresting circuit shown in FIG. 10.

FIGS. 11A-E illustrate an example of the operation of the multicarrier de-cresting circuit 1000 shown in FIG. 10. With reference to FIGS. 11A-E, horizontal axes 1102, 1104, 1106, 1108, 1110 indicate time. As shown in FIGS. 11A-E, time increases to the right. FIG. 11A includes a first waveform 1112, which corresponds to an illustrative portion of the composite multicarrier signal 1010. The first waveform 1112 further includes a waveform crest 1114, which corresponds to a relatively high-amplitude signal crest in the composite multicarrier signal 1010. Although the average power level of the composite multicarrier, signal 1010 can be relatively low, the waveform crest 1114 illustrates that the information sources, which contribute to the input symbol streams, can occasionally align and generate a relatively high-amplitude signal peak. For example, a signal peak that is about 10 dB above the average power level can occur with a probability of $10^{-4}$. In another example, 14 dB signal peaks can occur with a probability of $10^{-6}$.

Figure 11B:
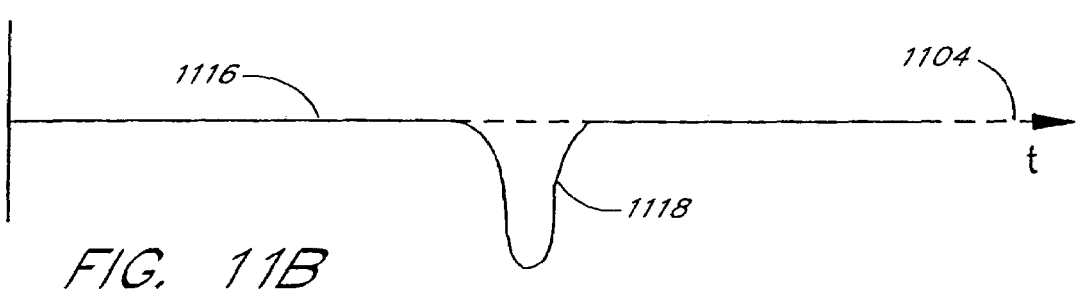

FIG. 11B illustrates a second waveform 1116 with a pulse 1118. The pulse 1118 of the second waveform 1116 corresponds to a band-limited pulse, such as a Gaussian pulse, which is generated by the de-cresting pulse generation circuit 1004 to destructively interfere with the relatively high-amplitude signal crest in the composite multicarrier signal 1010 as illustrated by the waveform crest 1114.

Figure 11C:
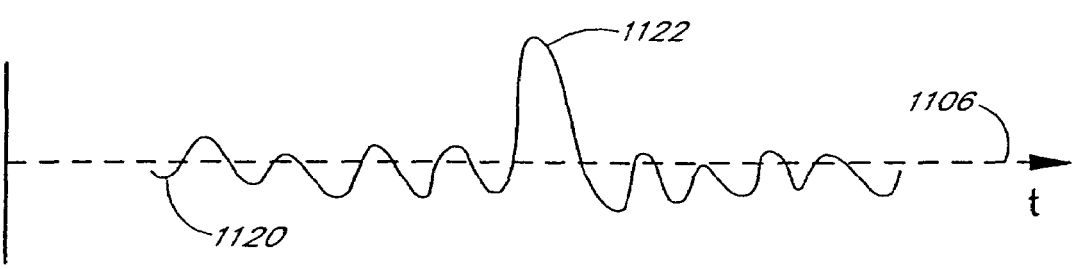

FIG. 11C illustrates a third waveform 1120, which corresponds to the time-delayed composite multicarrier signal 1016. The time delay circuit 1012 delays the composite multicarrier signal 1010 to the time-delayed composite multicarrier signal 1016 to compensate for the computational latency of the de-cresting pulse generation circuit 1004. This alignment is shown in FIGS. 11B and 11C by the alignment of the delayed signal crest 1122 with the pulse 1118.

Figure 11D:
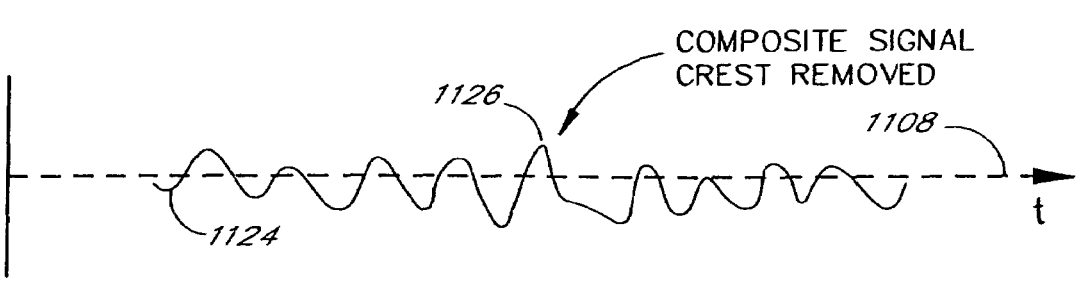
Figure 11E:
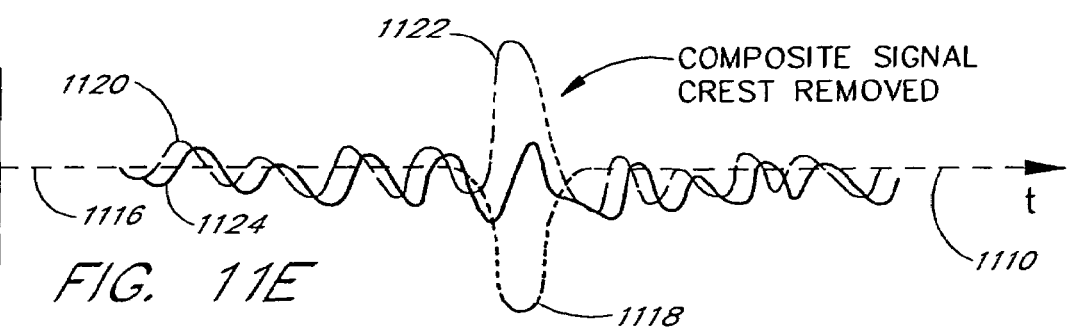

The band-limited pulse destructively interferes with the relatively high signal peak in the time-delayed composite multicarrier signal 1016. FIG. 11D illustrates a fourth waveform 1124, which corresponds to the output of the multi-input summing junction 1014. The fourth waveform 1124 is thus the linear superposition of the second waveform 1116 and the third waveform 1120. In the fourth waveform 1124, a compensated portion 1126 is substantially devoid of the waveform crest 1114 by the destructive interference induced by the band-limited pulse. FIG. 11E superimposes the second waveform 1116, the third waveform 1120, and the fourth waveform 1124.

Figure 12A:
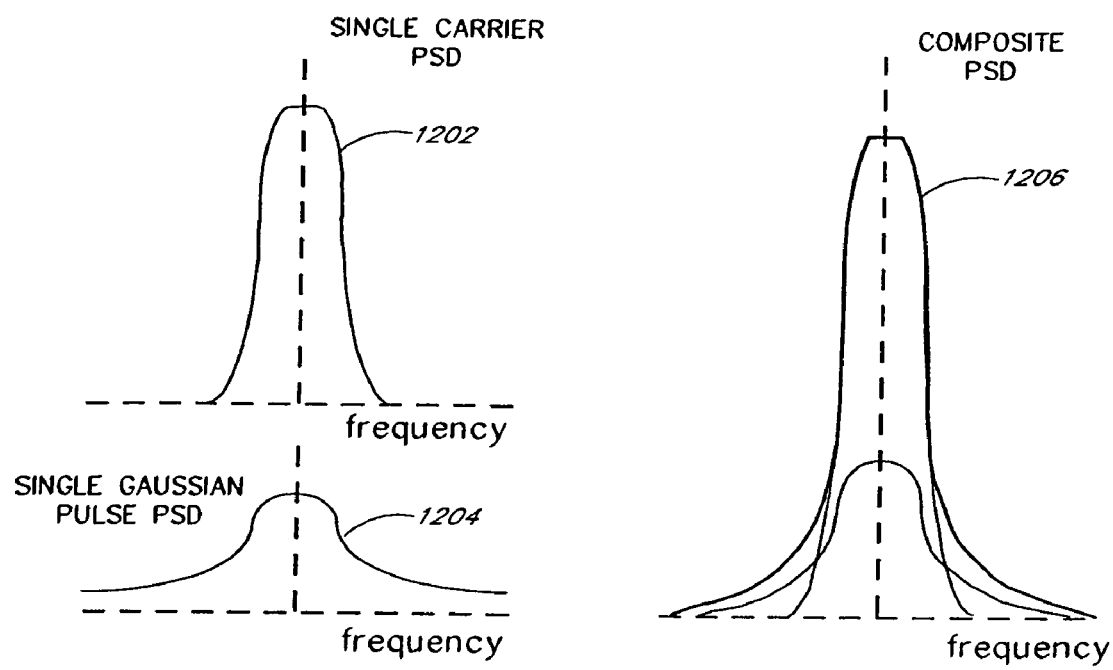
FIGS. 12A-C are power spectral density (PSD) plots of de-cresting with a single Gaussian pulse.
Figure 12B:
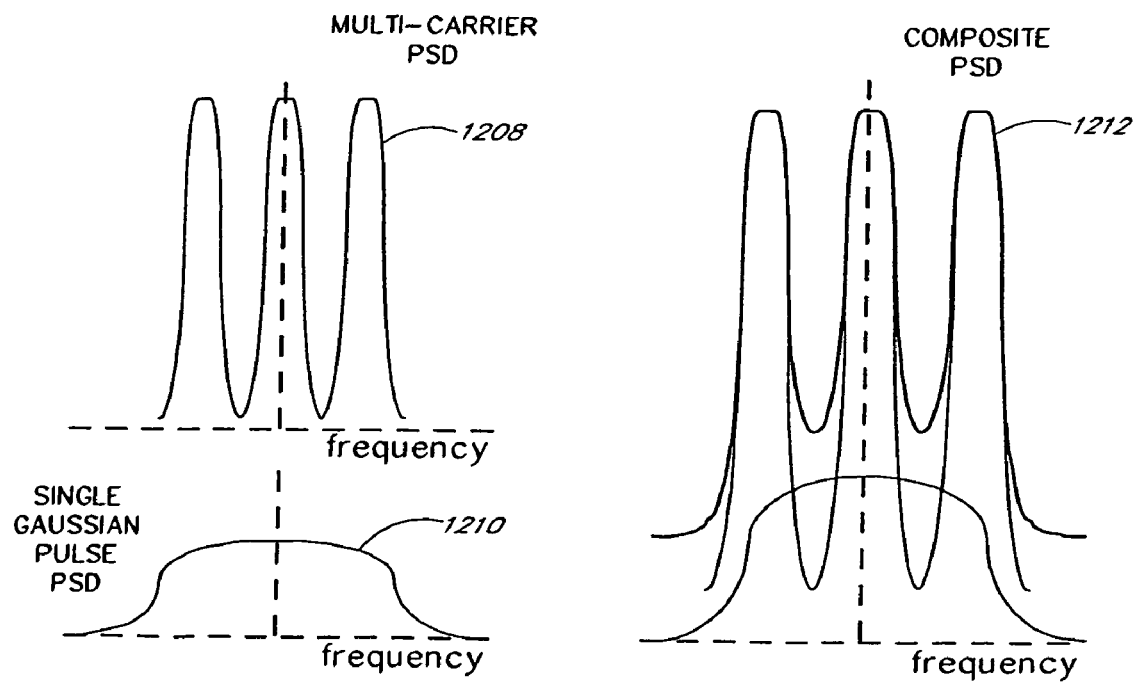
Figure 12C:
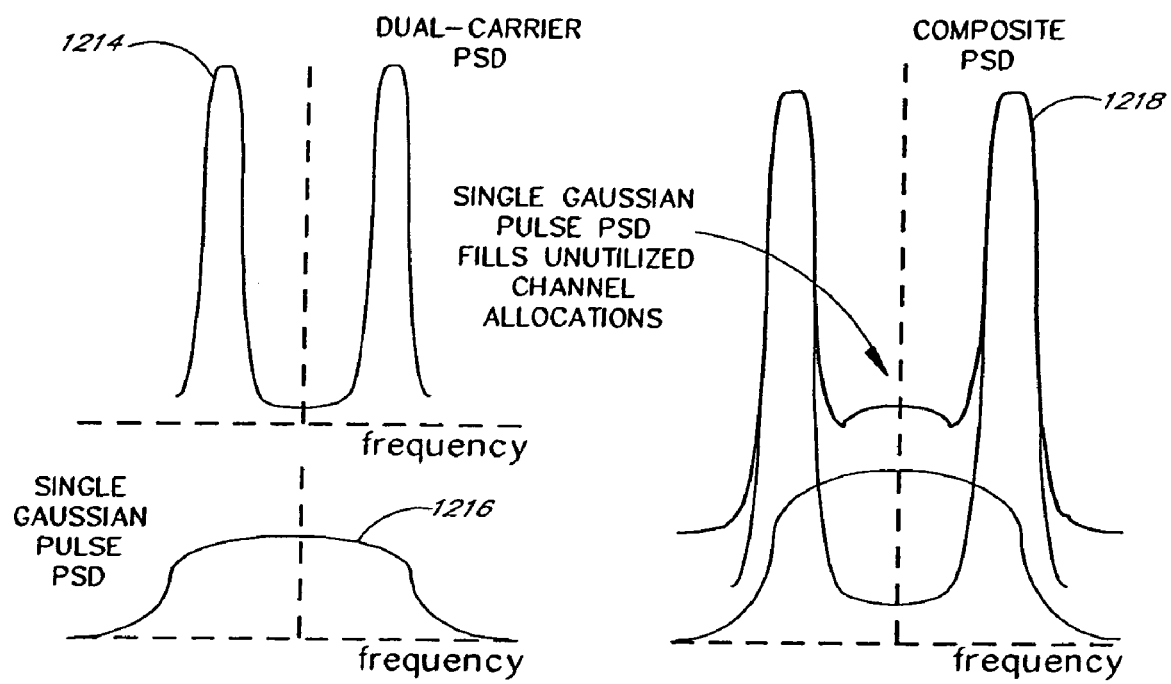

FIGS. 12A-C illustrate a complementary frequency domain analysis of the multicarrier de-cresting circuit that uses only a single Gaussian pulse to de-crest a composite waveform. FIG. 12A illustrates an example of a basic power spectral density plot (PSD) of a composite single carrier signal 1202 and a PSD plot of a single Gaussian pulse 1204. FIG. 12A also illustrates a resulting output signal power spectral density 1206 when the composite single carrier signal 1202 and the single Gaussian pulse 1204 are linearly combined. In one embodiment, the multicarrier de-cresting circuit 1000 expands the PSD only when the Gaussian pulse's characteristics expand the signal energy beyond the basic frequency allocation. Thus, the bandwidth expansion of the combined signal is readily controlled by controlling the characteristics of the de-cresting pulse generation circuit 1004 configured to generate a single Gaussian pulse.

FIG. 12B also illustrates the applicability of a generating a single Gaussian pulse to reduce a magnitude of a signal crest in a multicarrier application. A trace 1208 corresponds to a basic PSD plot corresponding to a multicarrier signal crest. A trace 1210 corresponds to a PSD plot of the single Gaussian pulse. A trace 1212 illustrates a composite PSD of the combination of the multicarrier signal crest with the single Gaussian pulse.

FIG. 12C illustrates a disadvantage of generating a single Gaussian pulse to reduce the magnitude of a signal crest in a multicarrier signal. In the example shown in FIG. 12C, one of the channel streams is dropped either temporarily or permanently from the composite multicarrier signal 1010. A trace 1214 corresponds to a basic PSD of the multicarrier signal crest with a channel stream dropped. A trace 1216 corresponds to a PSD plot of the single Gaussian pulse. A trace 1218 illustrates a composite PSD of the combination of the single Gaussian pulse and the multicarrier signal crest with the channel stream dropped. As shown in FIG. 12C, energy from the Gaussian pulse increases the residual energy level within the unoccupied channel allocation. The increase in residual energy in the unoccupied channel is relatively undesirable in a commercial application.

Embodiments of the invention, such as the multicarrier de-cresting circuit 1000 described in connection with FIG. 10, advantageously overcome the undesirable polluting of unoccupied channel allocations by injecting multiple band-limited pulses from multiple pulse generators. In one embodiment, the multiple band-limited pulses are Gaussian pulses. The generation of multiple band-limited pulses allows the pulse generator control to determine the PSD content in each of the allocated channels and advantageously insert Gaussian pulse energy only into occupied channels to counteract the signal peak. This advantageously prevents the injection of Gaussian pulse energy to unoccupied channel allocation.

Further, one embodiment of the pulse generator control 1008 is provided with the individual amplitude levels for each baseband channel's contribution to the overall composite signal's peak, so that the pulse generator control 1008 can weigh the amplitude of each Gaussian pulse according to the contribution to the peak in the composite multicarrier signal 1010.

FIGS. 13A-E illustrate the operation of the pulse generator control 1008 described in connection with FIG. 10. The pulse generator control 1008 advantageously provides multiple band-limited pulses, such as Gaussian pulses, that destructively interfere with the signal crests in the composite multicarrier signal 1010. With reference to FIGS. 13A-E, horizontal axes 1302, 1304, 1306, 1308, 1310 indicate time. As shown in FIGS. 13A-E, time increases to the right.

Figure 13A:
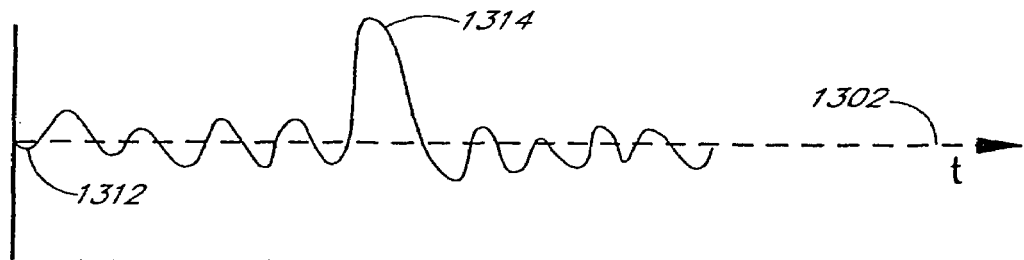
FIGS. 13A-E illustrate de-cresting with multiple Gaussian pulses.

FIG. 13A includes a first waveform 1312, which corresponds to a portion of the composite multicarrier signal 1010. The first waveform 1312 further includes a waveform crest 1314, which corresponds to a relatively high-amplitude signal crest in the composite multicarrier signal 1010. The first waveform 1312 and the waveform crest 1314 are similar to the first waveform 1112 and the waveform crest 1114 described in connection with FIG. 11A.

Figure 13B:
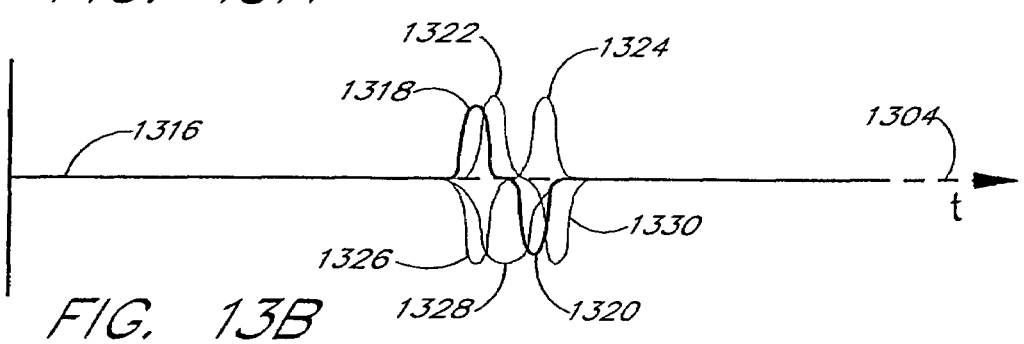

FIG. 13B illustrates a second waveform 1316 that includes cancellation pulses 1318, 1320 that are generated from a family of band-limited pulses 1322, 1324, 1326, 1328, 1330, such as Gaussian pulses. In contrast to a single destructive pulse, such as the pulse 1118 described earlier in connection with FIG. 11B, the cancellation pulses 1318, 1320 in the second waveform 1316 include multiple cancellation pulses. The pulses in the family of band-limited pulses 1322, 1324, 1326, 1328, 1330 are selected to be centered at the corresponding active channel frequencies. The cancellation pulses 1318, 1320 of the second waveform 1316 are generated by the de-cresting pulse generation circuit 1004 to destructively interfere with the relatively high-amplitude signal crest in the composite multicarrier signal 1010 as illustrated by the waveform crest 1314.

Figure 13C:
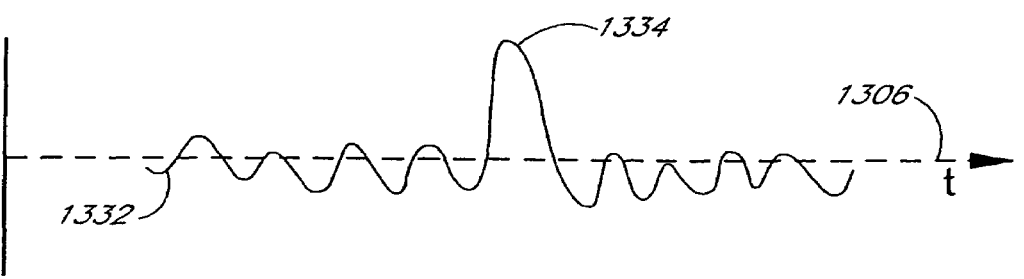

FIG. 13C illustrates a third waveform 1332, which corresponds to the time-delayed composite multicarrier signal

1016. The time delay circuit 1012 delays the composite multicarrier signal 1010 to the time-delayed composite multicarrier signal 1016 to compensate for the computational latency of the de-cresting pulse generation circuit 1004. This alignment is shown in FIGS. 13B and 13C by the alignment of a delayed signal crest 1334 with the cancellation pulses 1318, 1320.

Figure 13D:
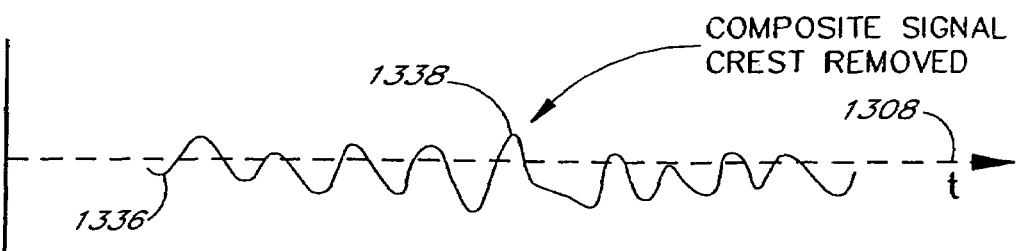
Figure 13E:
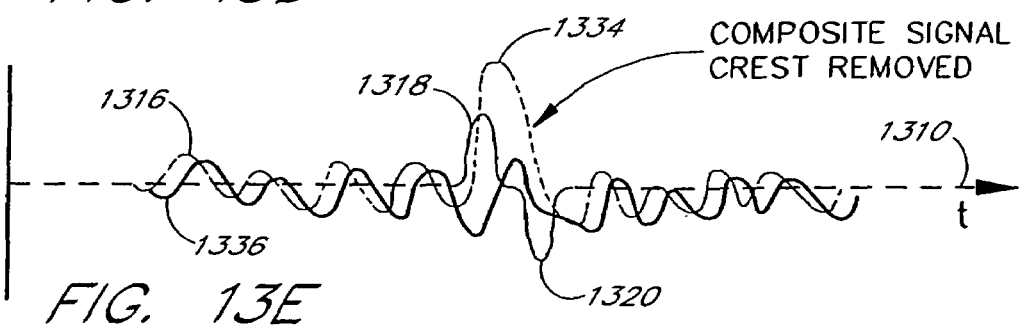

The cancellation pulses 1318, 1320 destructively interfere with the relatively high signal peak in the time-delayed composite multicarrier signal 1016. FIG. 13D illustrates a fourth waveform 1336, which corresponds to the output of the multi-input summing junction 1014. The fourth waveform 1336 is thus the linear superposition of the second waveform 1316 and the third waveform 1332. In the fourth waveform 1336, a compensated portion 1338 is substantially devoid of the waveform crest 1314 by the destructive interference induced by the band-limited pulse. FIG. 13E superimposes the second waveform 1316, the third waveform 1332, and the fourth waveform 1336.

Figure 14A:
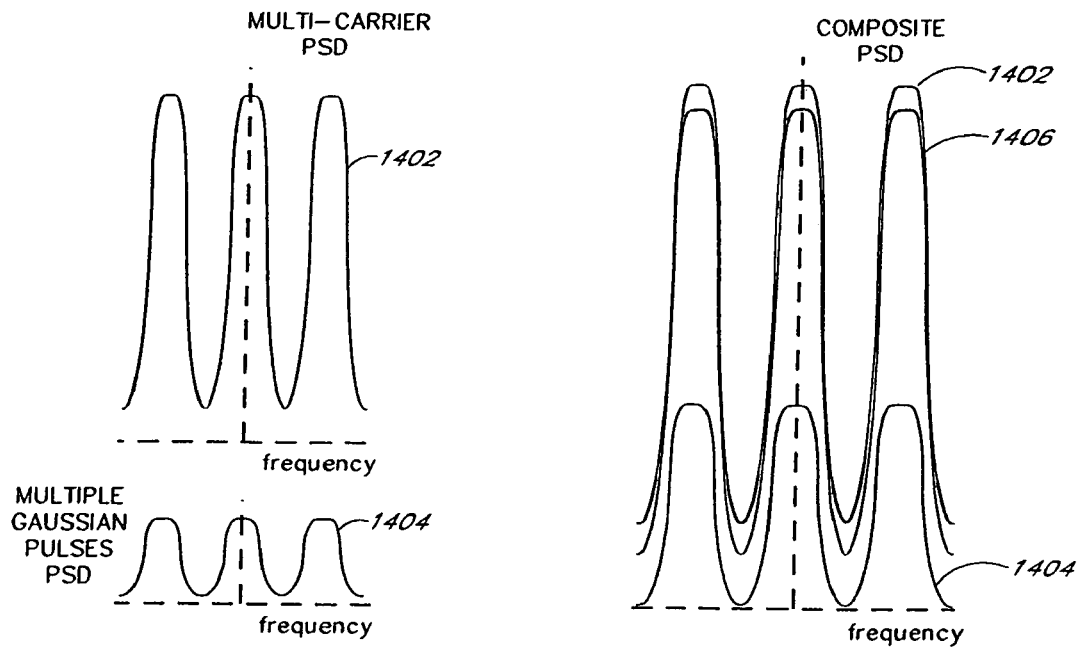
FIGS. 14A and 14B illustrate the results of a complementary frequency domain analysis of a multicarrier de-cresting circuit.
Figure 14B:
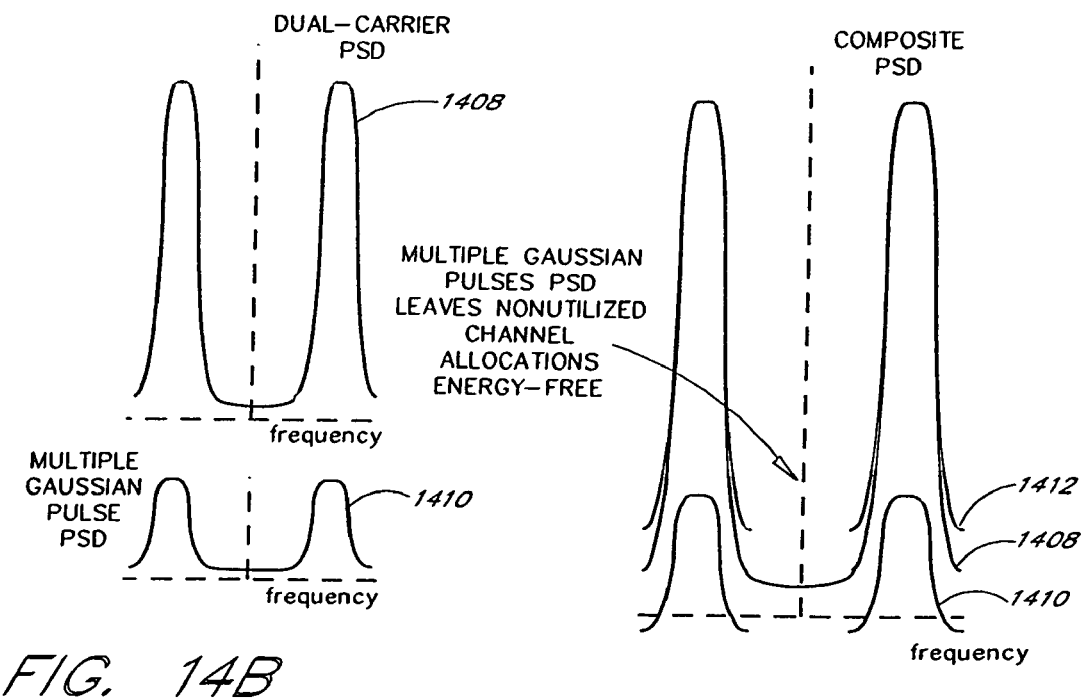

FIGS. 14A and 14B illustrate the results of a complementary frequency domain analysis of the multicarrier de-cresting circuit 1000. With reference to FIG. 14A, a trace 1402 is a basic PSD plot of the composite multicarrier signal 1010, which is provided as an input to the de-cresting pulse generation circuit 1004. A trace 1404 is a PSD plot of the multiple Gaussian pulses, which are the outputs of the de-cresting pulse generation circuit 1004. A trace 1406 is a PSD plot of the de-crested composite multicarrier signal 1018 of the multi-input summing junction 1014, which combines the time-delayed composite multicarrier signal 1016 with the multiple Gaussian pulses. The trace 1406 illustrates that the PSD bandwidth expansion of the de-crested composite multicarrier signal 1018 can be relatively readily controlled by managing the PSD of the corresponding multiple Gaussian pulses from the de-cresting pulse generation circuit 1004.

With reference to FIG. 14B, a trace 1408 is a PSD plot of the composite multicarrier signal 1010, where the composite multicarrier signal 1010 includes a non-utilized channel allocation. Advantageously, embodiments of the invention can inject multiple Gaussian pulses to destructively interfere with signal peaks at the utilized channel allocations, thereby preventing the expansion or pollution of the frequency spectrum. A trace 1410 is a PSD plot of multiple Gaussian pulses, which correspond to output of the de-cresting pulse generation circuit 1004. In one embodiment, each of the multiple Gaussian pulses generated by the de-cresting pulse generator is substantially band-limited to its corresponding channel. A trace 1412 is a PSD plot of the de-crested composite multicarrier signal 1018 of the multi-input summing junction 1014, which combines the time-delayed composite multicarrier signal 1016 with the multiple Gaussian pulses. In contrast to the injection of a single Gaussian pulse de-crest the composite multicarrier signal 1010, which is illustrated in FIG. 12C, the injection of multiple Gaussian pulses corresponding only to allocated channels is advantageously relatively free from spectral pollution.

Figure 15:
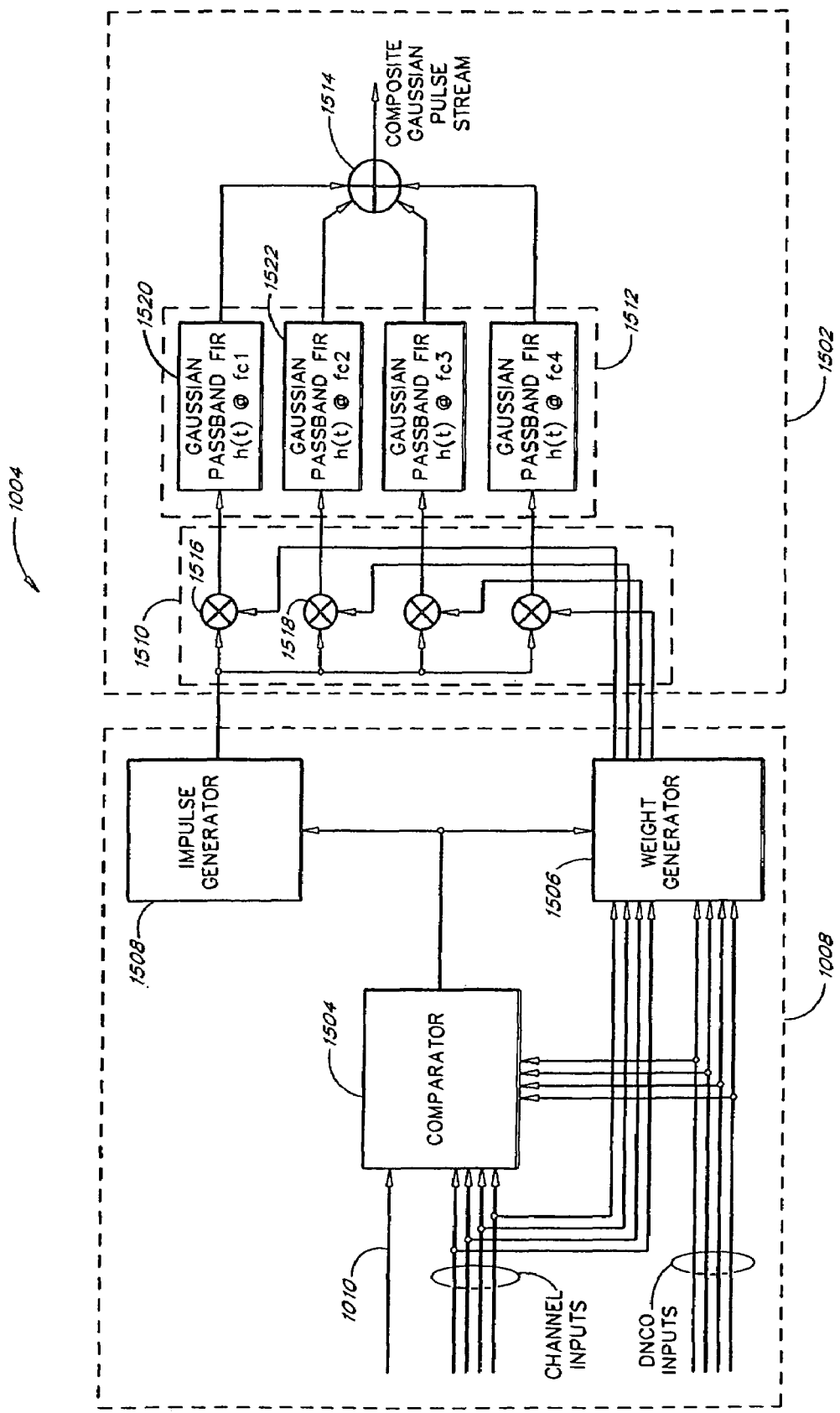
FIG. 15 illustrates one embodiment of a de-cresting pulse generation circuit.

FIG. 15 illustrates one embodiment of the de-cresting pulse generation circuit 1004. The de-cresting pulse generation circuit 1004 advantageously provides multiple band-limited pulses to de-crest the composite multicarrier signal 1010 with relatively little pollution of the frequency spectrum.

The illustrated de-cresting pulse generation circuit 1004 includes the pulse generator control 1008 and a pulse generator 1502. The pulse generator control 1008 shown in FIG. 15 further includes a comparator 1504, a weight generator 1506, and an impulse generator 1508.

The composite multicarrier signal 1010 is provided as an input to the comparator 1504. In addition, the comparator 1504 receives channel inputs from the pulse shaping filters and phase information from digital NCO sources. This information enables the comparator 1504 to determine whether to apply single or multiple cancellation pulses to de-crest the composite multicarrier signal 1010 or the time-delayed composite multicarrier signal 1016. In one embodiment, the comparator 1504 compares these signals to reference information of the intrinsic waveform. The reference information can include the average, the peak, and other pertinent signal statistics to determine whether to apply cancellation pulses to de-crest the composite multicarrier signal 1010.

When the comparator 1504 has determined that a cancellation pulse or a group of cancellation pulses will be applied, the comparator 1504 calculates a duration for a cancellation pulse and instructs the impulse generator 1508 to provide a sequence of impulses to the pulse generator 1502.

The weight generator 1506 provides weight values to the pulse generator 1502. The weight values are used by the pulse generator 1502 to vary an amount of a band-limited de-cresting pulse injected into a channel according to the weight value corresponding to the channel.

In one embodiment, the weight generator 1506 calculates a relative magnitude and phase for each channel's contribution to the crest in the composite multicarrier signal 1010 and provides weight values to the pulse generator 1502 so that each channel suffers an approximately equal degradation in signal quality. The weight values generated by the weight generator 1506 can advantageously be set at a zero weight for inactive channels and a relatively high weight for relatively high-power channels. The weight values can correspond to positive values, to negative values, to zero, and to complex values. This allows the error vector magnitude (EVM) to be approximately equal for all active channels, while simultaneously eliminating or reducing signal crests.

In another embodiment, a single active channel is randomly selected for introduction of a stronger correction pulse. This lowers aggregate error rates, but increases the severity of the errors.

The pulse generator 1502 includes a group of multipliers 1510, a group of filters 1512, and a summing circuit 1514. It will be understood by one of ordinary skill in the art that the waveshaping circuits and sub-circuits disclosed herein can be configured to process an arbitrary or "N" number of channels. In addition, although the pulse generator 1502 can include processing capability for several channels, it will be understood by one of ordinary skill in the art that some applications will not utilize all of the processing capability.

The group of multipliers 1510 in the illustrated pulse generator 1502 can include "N" multipliers. A first multiplier 1516 multiplies the impulses from the pulse generator 1502 with the weight value from the weight generator 1506 that corresponds to a first channel. A second multiplier 1518 similarly multiplies the impulses from the pulse generator 1502 with the weight value from the weight generator 1506 that corresponds to a second channel.

The group of filters 1512 in the illustrated pulse generator 1502 can include "N" passband filters. A first passband filter 1520 generates band-limited pulses in response to receiving impulses from the first multiplier 1516. The band-limited pulses from the first passband filter 1520 are centered at approximately the first channel's frequency band or allocation. In one embodiment, the first passband filter 1520 is a Gaussian passband finite impulse response (FIR) filter.

A second passband filter 1522 similarly generates band-limited pulses in response to receiving impulses from the second multiplier 1518. The band-limited pulses from the second passband filter 1522 are centered at approximately the second channel's frequency band or allocation. In one embodiment, the second passband filter 1522 is a Gaussian passband FIR filter. Preferably, all passband filters in the group of filters 1512 are FIR filters so that the outputs of the passband filters are phase aligned.

The summing circuit 1514 combines the outputs of the first passband filter 1520, the second passband filter 1522, and other passband filters, as applicable, in the group of filters 1512. The output of the summing circuit 1514 is a composite stream of Gaussian pulses, which is then applied to the multi-input summing junction 1014 to reduce or to eliminate relatively high amplitude signal crests. In another embodiment, the individual outputs of the passband filters in the group of filters 1512 are applied directly the multi-input summing junction 1014.

Figure 16:
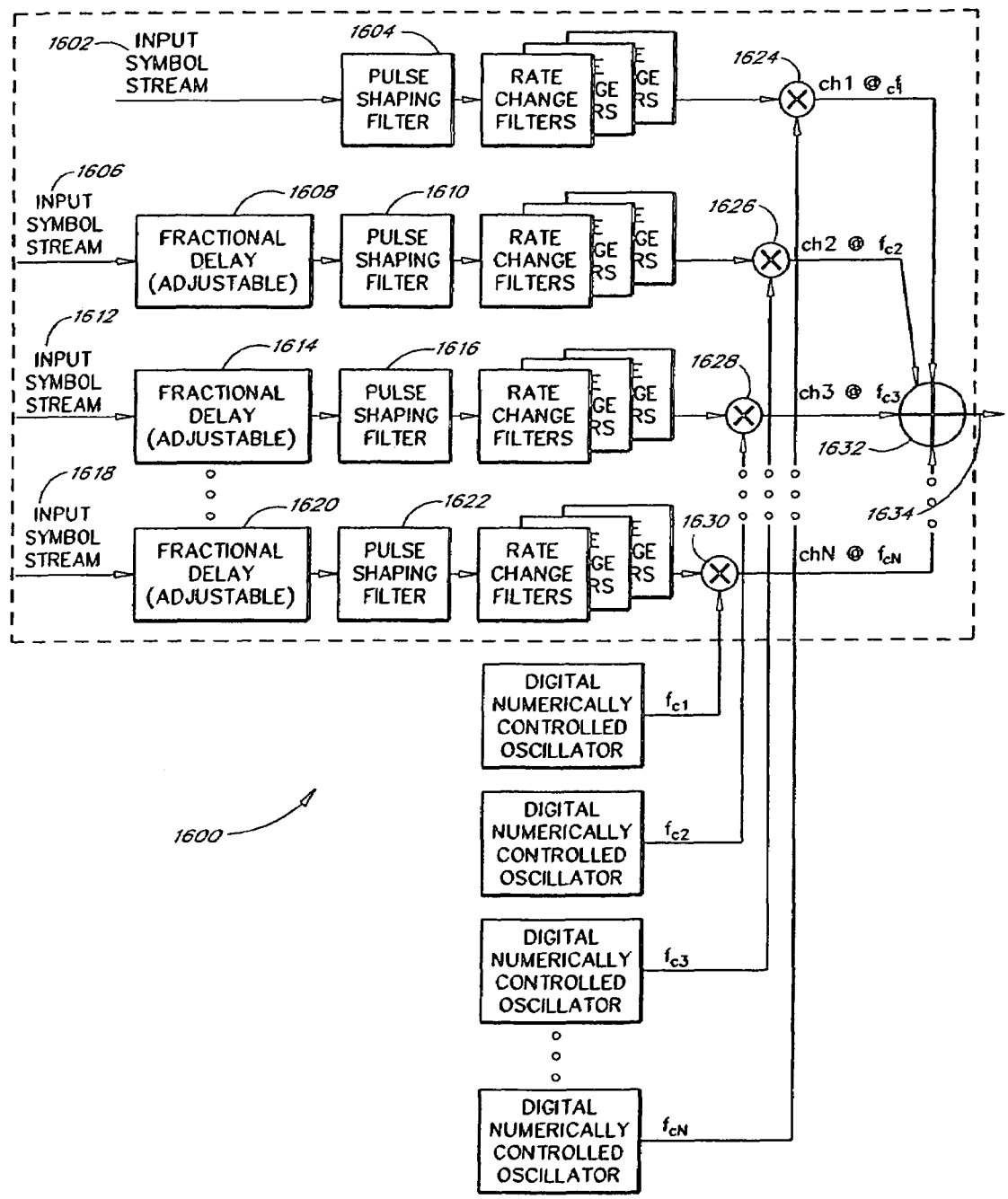
FIG. 16 illustrates a pulse-shaping filter according to an embodiment of the present invention.

FIG. 16 illustrates a multiple channel circuit 1600 according to an embodiment of the present invention. The multiple channel circuit 1600 advantageously reduces the likelihood of the occurrences of signal crests in composite waveforms, and can be used to decrease a frequency of application of waveshaping. It will be understood by one of ordinary skill in the art that the number of channels pulse shaped and combined by the multiple channel circuit 1600 can be arbitrarily large.

The multiple channel circuit 1600 includes fractional delays, which stagger the input symbol streams relative to each other by fractions of a symbol period. In one embodiment, the delay offset from one symbol stream to another is determined by allocating the symbol period over the number of active symbol streams. For example, where "x" corresponds to a symbol period and there are four input symbol streams, a first symbol stream can have 0 delay, a second input symbol stream can have 0.25x delay, a third input symbol stream can have 0.50x delay, and a fourth input symbol stream can have 0.75x delay.

The illustrated embodiment of the multiple channel circuit 1600 implements the fractional delay to the data streams before the pulse shaping filters. In one example, "N," or the number of active symbol streams, corresponds to 4. In the multiple channel circuit 1600, a first input symbol stream 1602 is applied as an input directly to a first pulse-shaping filter 1604 without fractional delay. In another embodiment, the data stream associated with the first input symbol stream 1602 includes a fractional delay.

A second input symbol stream 1606 is provided as an input to a first fractional delay circuit 1608, which delays the second input symbol stream 1606 relative to the first input symbol stream 1602 by a first fraction of a symbol period, such as 0.25 of the symbol period. A third input symbol stream 1612 is provided as an input to a second fractional delay circuit 1614, which delays the third input symbol stream 1612 relative to the first input symbol stream 1602 by a second fraction of the symbol period, such as 0.50 of the symbol period. A fourth input symbol stream 1618 is applied to a third fractional delay circuit 1620, which delays the fourth input symbol stream 1618 by a third fraction of a symbol period, such as 0.75 of the symbol period.

The staggered symbol streams are mixed by their respective mixer circuits 1624, 1626, 1628, 1630 and combined by a summing circuit 1632. The staggering of the symbol streams reduces the probability of occurrence of signal crests in the resulting composite waveform 1634 because the staggering displaces each channel's individual signal crest from another channel's signal crest as a function of time. This decreases the probability of a mutual alignment in amplitude and phase in the composite waveform 1634.

However, it will be understood by one of ordinary skill in the art that the fractional delay can be applied elsewhere, such as embedded directly within a pulse-shaping filter, applied post pulse-shaping, and the like. In one embodiment, the amount of the fractional delay for each symbol stream is fixed in hardware. In another embodiment, the fractional delays can be selected or programmed by, for example, firmware.

Some systems that are susceptible to relatively high-amplitude signal peaks or crests are incompatible with techniques that modify the amplitude of the underlying signals to reduce or to eliminate the relatively high-amplitude signal peaks in a composite multicarrier signal. One example of such a system is an EDGE system, where introduction of amplitude modulating pulses such as band-limited Gaussian pulses is undesirable and may not be permissible.

Figure 17B:
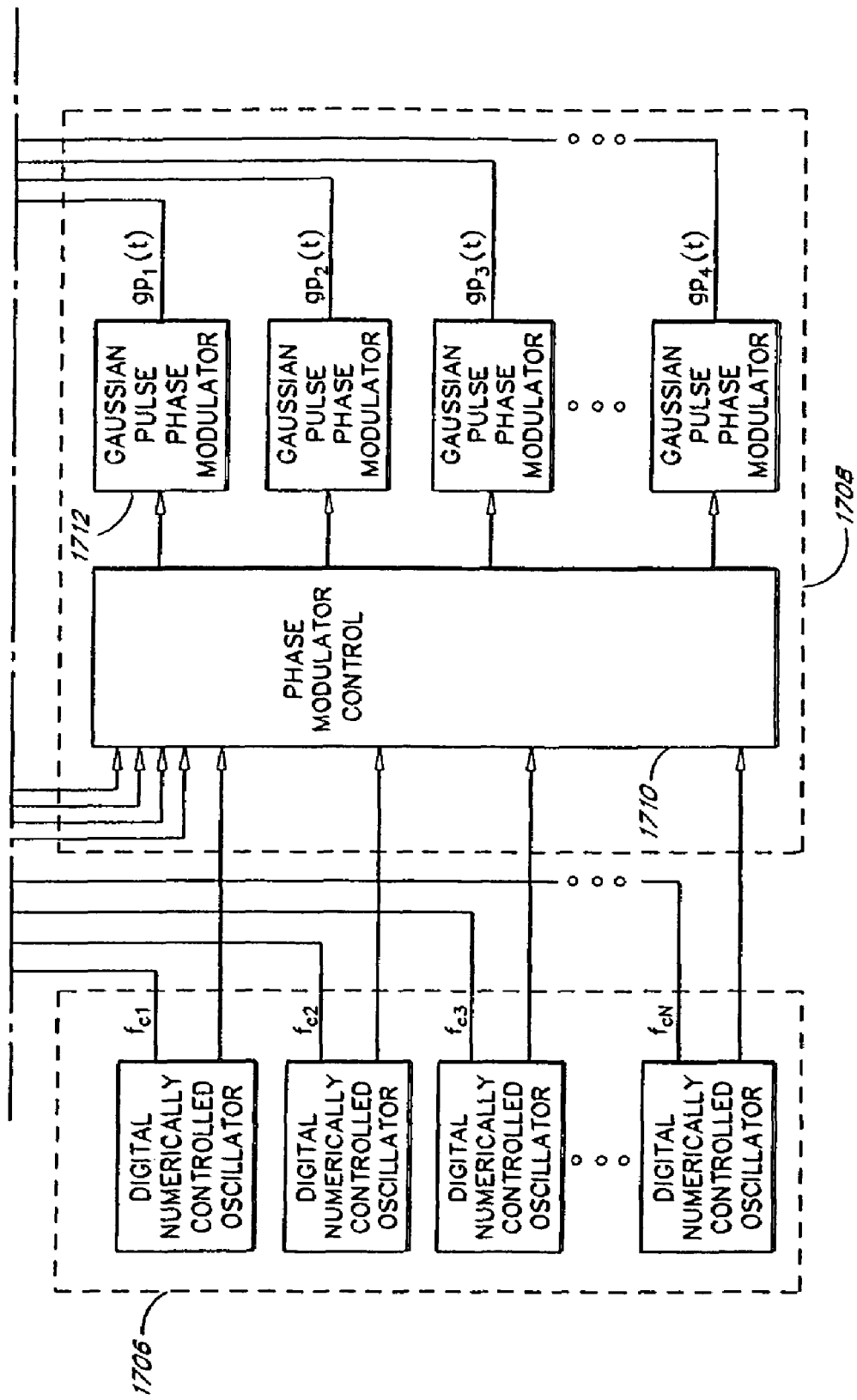
FIG. 17 consists of FIGS. 17A and 17B illustrates a phase-modulating waveshaping circuit according to an embodiment of the present invention.

FIG. 17 illustrates a phase-modulating waveshaping circuit 1700 according to an embodiment of the present invention. Advantageously, the phase-modulating waveshaping circuit 1700 reduces or eliminates relatively high-amplitude signal crests in composite multi-carrier signals without modulation of the amplitude of the underlying signals. Rather than sum a composite multicarrier signal with band-limited pulses to de-crest the composite multicarrier signal as described in connection with FIG. 10, the phase-modulating waveshaping circuit 1700 modulates the phases of the input symbol streams to reduce or to eliminate relatively high signal crests in the resulting composite multicarrier signal. It will be understood by one of ordinary skill in the art that the phase-modulating waveshaping circuit 1700 can be configured to process an arbitrary or "N" number of channels.

The phase-modulating waveshaping circuit 1700 includes a multiple channel circuit 1702, a de-cresting combiner 1704, digital NCOs 1706, and a pulse phase modulation circuit 1708. The multiple channel circuit 1702 receives the input symbol streams, pulse shapes and upconverts the input symbol streams. The pulse shaped and upconverted input streams are provided as inputs to the de-cresting combiner 1704 and to a pulse phase modulator control 1710 of the pulse phase modulation circuit 1708.

One embodiment of the pulse phase modulation circuit 1708 is substantially the same as the de-cresting pulse generation circuit 1004 described in connection with FIGS. 10 and 15. However, rather than summing the composite multicarrier signal with the generated band-limited pulses, the band-limited pulses are used to phase modulate the upconverted symbol streams. As such, the pulse phase modulator control 1710 corresponds to the pulse generator control 1008. The pulse phase modulator control 1710 predicts whether the current modulation streams and digital NCO phase combinations will constructively interfere with each other and result in a composite waveform crest. Where a crest is predicted, the Gaussian pulse phase modulators are engaged to relatively slowly modulate the individual channel phases to prevent or to reduce a signal crest in the composite waveform.

A Gaussian pulse phase modulator, such as a first Gaussian pulse phase modulator 1712 corresponds to a Gaussian pulse generator, such as a first Gaussian pulse generator 1020. Again, the corresponding Gaussian pulses $gp_1(t)$, $gp_2(t)$, and so forth, generated by the Gaussian pulse phase modulators of the pulse phase modulation circuit 1708 are band-limited to their corresponding input symbol stream's allocated channel.

The de-cresting combiner 1704 includes multiple delay circuits 1714, 1716, 1718, 1720, which align the upconverted symbol streams from the multiple channel circuit 1702 with the Gaussian pulses from the pulse phase modulation circuit

1708. The de-cresting combiner 1704 further includes phase modulators 1722, 1724, 1726, 1728, which phase modulate their respective upconverted input symbol streams in accordance with the respective Gaussian pulse from the pulse phase modulation circuit 1708. A summing circuit 1730 combines the outputs of the phase modulators 1722, 1724, 1726, 1728 and provides a de-crested composite multicarrier signal 1732 as an output.

The skilled practitioner will recognize that care should be taken to ensure that the rate of change of phase due to this correction process does not exceed the capability of the downstream receivers to track effective channel phase variations.

One embodiment of the present invention further uses a pulse generator control or a pulse phase modulator control that is already used to de-crest or to waveshape composite signals to continually monitor and to report the amplitude and phase information of each individual baseband channel. This information can be readily utilized to extract the average and peak power levels of individual channels. In addition, the presence of active or dormant channels can be readily ascertained. This information is extremely useful for external subsystems in a range of communications applications.

In one embodiment, a waveshaping circuit includes a communications port, such as a serial communications port or a parallel communications port that enables this information to be transmitted to external devices. In another embodiment, the collected information is stored in a memory structure, which is accessed by multiple external devices requiring such information. The information can be ported to an amplifier linearization chip such as the PM7800 PALADIN product from PMCS.

One embodiment of the waveshaping circuit is implemented in dedicated hardware such as a field programmable gate array (FPGA) or dedicated silicon in an application specific integrated circuit (ASIC). In a relatively low data rate application, a general purpose digital signal processor (DSP), such as a TMS320C60 from Texas Instruments Incorporated or a SHARC processor from Analog Devices, Inc., performs the waveshaping signal processing.

A conventional microprocessor/microcontroller or general purpose DSP can interface to a waveshaping circuit to adaptively control the waveshaping process. For example, a de-cresting control can operate in non-real time, and a general purpose DSP or microprocessor such as a TMS320C54/TMS320C60/TMS320C40/ARM 7 or Motorola 68000 device can be used for control. Preferably, the DSP or microprocessor includes non-volatile ROM for both program storage and factory installed default parameters. Both ROM and Flash ROM are relatively well suited for this purpose. As with most DSP or microprocessor designs, a proportional amount of RAM is used for general-purpose program execution. In one embodiment, a relatively low speed portion of the waveshaping circuit implemented with a DSP or a microprocessor core and a relatively high speed portion of the waveshaping circuit implemented in an ASIC or an FPGA is integrated onto a single ASIC chip with an appropriate amount of RAM and ROM. Examples of licensable cores include the ARM7 from Advanced RISC Machines, Ltd., the Teak from DSP Group Inc., the Oak from DSP Group Inc., and the ARC from ARC Cores.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A pulse-shaping circuit that reduces a probability of an alignment in amplitude and phase of similar symbols in a plurality of input symbol streams including at least a first input symbol stream and a second input symbol stream, wherein the plurality of input symbol streams are eventually upconverted and combined to a composite data stream such that a reduction in the probability of the alignment reduces a probability of a large signal crest in the composite data stream, the pulse-shaping circuit comprising:

a plurality of pulse-shaping filters configured to pulse-shape the plurality of input symbol streams to form a corresponding plurality of baseband streams;

a plurality of multipliers configured to receive a plurality of input carrier streams and to upconvert the plurality of baseband streams to a plurality of upconverted streams;

a summing circuit that is configured to combine the upconverted streams to the composite signal; and a delay circuit in at least a first data path, wherein the first data path is a path from an input symbol stream to the composite data stream, wherein the delay circuit is configured to delay data in the first data path by a fraction of a symbol period relative to data in a second data path to stagger symbols input symbols of the first data path relative to input symbols of the second data path.

2. A pulse-shaping circuit that reduces a probability of an alignment in amplitude and phase of similar symbols in a plurality of input symbol streams including at least a first input symbol stream and a second input symbol stream, wherein the plurality of input symbol streams are eventually upconverted and combined to a composite data stream such that a reduction in the probability of the alignment reduces a probability of a large signal crest in the composite data stream, the pulse-shaping circuit comprising:

a plurality of pulse-shaping filters configured to pulse-shape the plurality of input symbol streams to form a corresponding plurality of baseband streams;

a plurality of multipliers configured to receive a plurality of input carrier streams and to upconvert the plurality of baseband streams to a plurality of upconverted streams;

a summing circuit that is configured to combine the upconverted streams to the composite signal; and a delay circuit in at least a first data path, wherein the first data path is a path from an input symbol stream to the composite data stream, wherein the delay circuit is configured to delay data in the first data path by a fraction of a symbol period relative to data in a second data path, wherein the at least first data path comprises a plurality of data paths with delay circuits, wherein the delay circuits delay data in their respective data paths relative to data in the second data path with delays distributed approximately evenly through the symbol period.

3. The pulse-shaping circuit as defined in claim 1, wherein the delay circuit in the first data path is configured to delay data between the first input symbol stream and the first pulse shaped filter.

4. A method of digitally reducing a probability of an alignment in amplitude and phase of similar symbols in a plurality of data streams, the method comprising:

receiving the plurality of data streams, wherein the plurality of data streams include at least a first data stream and a second data stream;

delaying the second data stream relative to the first data stream by a fraction of a symbol period prior to the eventual combining of the plurality of data streams such that symbols of the second data stream are staggered relative to symbols of the first data stream; and pulse-shaping, upconverting, and combining the plurality of data streams to a composite data stream such that a reduction in the probability of the alignment reduces a probability of large signal crest in the composite data stream.

5. A method of digitally reducing a probability of an alignment in amplitude and phase of similar symbols in a plurality of data streams, the method comprising:

receiving the plurality of data streams, wherein the plurality of data streams include at least a first data stream and a second data stream;

delaying the second data stream relative to the first data stream by a fraction of a symbol period prior to the eventual combining of the plurality of data streams, wherein the plurality of data streams includes the first data stream and other data streams, wherein the fraction of the symbol period from which the other data streams are delayed relative to the first data stream substantially evenly through the symbol period; and pulse-shaping, upconverting, and combining the plurality of data streams to a composite data stream such that a reduction in the probability of the alignment reduces a probability of large signal crest in the composite data stream.

6. A method of digitally reducing a probability of an alignment in amplitude and phase of similar symbols in a plurality of data streams, the method comprising:

receiving the plurality of data streams, wherein the plurality of data streams include at least a first data stream and a second data stream;

delaying the second data stream relative to the first data stream by a fraction of a symbol period prior to the eventual combining of the plurality of data streams, wherein the plurality of data streams includes "N" data streams, wherein the fraction of the symbol period from a data stream other than the first data stream is delayed relative to the first data stream by about a fraction of time equal to a multiple of the symbol period divided by N, so that the data streams other than the first data stream are substantially evenly delayed through the symbol period; and pulse-shaping, upconverting, and combining the plurality of data streams to a composite data stream such that a reduction in the probability of the alignment reduces a probability of large signal crest in the composite data stream.

7. An apparatus for digitally reducing a probability of an alignment in amplitude and phase of similar symbols in a plurality of data streams, the apparatus comprising:

means for receiving the plurality of data streams, wherein the plurality of data streams include at least a first data stream and a second data stream;

means for delaying the second data stream relative to the first data stream by a fraction of a symbol period prior to the eventual combining of the plurality of data streams such that symbols of the second data stream are staggered relative to symbols of the first data stream; and means for pulse-shaping, upconverting, and combining the plurality of data streams to a composite data stream such that a reduction in the probability of the alignment reduces a probability of large signal crest in the composite data stream.

8. An apparatus for digitally reducing a probability of an alignment in amplitude and phase of similar symbols in a plurality of data streams, the apparatus comprising:

means for receiving the plurality of data streams, wherein the plurality of data streams include at least a first data stream and a second data stream;

means for delaying the second data stream relative to the first data stream by a fraction of a symbol period prior to the eventual combining of the plurality of data streams, wherein the plurality of data streams includes the first data stream and other data streams, wherein the fraction of the symbol period from which the other data streams are delayed relative to the first data stream substantially evenly through the symbol period; and means for pulse-shaping, upconverting, and combining the plurality of data streams to a composite data stream such that a reduction in the probability of the alignment reduces a probability of large signal crest in the composite data stream.

9. An apparatus for digitally reducing a probability of an alignment in amplitude and phase of similar symbols in a plurality of data streams, the apparatus comprising:

means for receiving the plurality of data streams, wherein the plurality of data streams include at least a first data stream and a second data stream;

means for delaying the second data stream relative to the first data stream by a fraction of a symbol period prior to the eventual combining of the plurality of data streams, wherein the plurality of data streams includes "N" data streams, wherein the fraction of the symbol period from a data stream other than the first data stream is delayed relative to the first data stream by about a fraction of time equal to a multiple of the symbol period divided by N, so that the data streams other than the first data stream are substantially evenly delayed through the symbol period; and means for pulse-shaping, upconverting, and combining the plurality of data streams to a composite data stream such that a reduction in the probability of the alignment reduces a probability of large signal crest in the composite data stream.

* * * * *